US012705675B2

(12) United States Patent
Young et al.

(10) Patent No.: US 12,705,675 B2
(45) Date of Patent: Aug. 11, 2026

(54) AUTOMATED, PARAMETER-PATTERN-DRIVEN, DATA MINING SYSTEM BASED ON CUSTOMIZABLE CHAIN OF MACHINE-LEARNING-STRUCTURES PROVIDING AN AUTOMATED DATA-PROCESSING PIPELINE, AND METHOD THEREOF

(71) Applicant: AccuQuote, Inc., Schaumburg, IL (US)

(72) Inventors: Thomas Young, Zürich (CH); Rory Creedon, Zürich (CH)

(73) Assignee: AccuQuote, Inc., Schaumburg, IL (US)

( * ) Notice: Subject to any disclaimer, the term of this patent is extended or adjusted under 35 U.S.C. 154(b) by 30 days.

(21) Appl. No.: 18/544,018

(22) Filed: Dec. 18, 2023

(65) Prior Publication Data

US 2024/0119537 A1 Apr. 11, 2024

Related U.S. Application Data

(63) Continuation of application No. PCT/EP2023/069634, filed on Jul. 14, 2023.

(30) Foreign Application Priority Data

Jul. 14, 2022 (CH) .................................... 839/2022

(51) Int. Cl.
*G06Q 40/00* (2023.01)
*G06N 20/00* (2019.01)
(Continued)

(52) U.S. Cl.
CPC ............ *G06Q 40/08* (2013.01); *G06N 20/00* (2019.01); *G06Q 10/0635* (2013.01); *G06Q 50/18* (2013.01)

(58) Field of Classification Search
CPC .... G06Q 40/08; G06Q 10/0635; G06Q 50/18; G06Q 30/0201; G06Q 10/10; G06N 20/00
See application file for complete search history.

(56) References Cited

U.S. PATENT DOCUMENTS 7,792,731 B2 * 9/2010 Wollin .................. G06Q 40/02 705/7.41
8,224,678 B2 * 7/2012 Paradis ................. G06Q 20/20 705/4

(Continued)

FOREIGN PATENT DOCUMENTS

CN 113032552 A 6/2021
CN 113240531 A 8/2021

OTHER PUBLICATIONS

Survey of machine learning methods for big data applications; 2017 International Conference on Computational Intelligence in Data Science(ICCIDS) (2017, pp. 1-5); A. Vinothini, S. Baghavathi Priya; Jun. 2, 2017 . . . (Year: 2017).*

(Continued)

*Primary Examiner* — Tien C Nguyen
(74) *Attorney, Agent, or Firm* — Ballard Spahr LLP

(57) ABSTRACT

Proposed is a parameter pattern-driven, data mining system and corresponding method with a knowledge extraction engine based on a customizable chain of machine-learning-structures providing an automated pipeline for data processing of complex data structures with a hidden pattern detection for triggering automated under-writing processes. A plurality of digital risk-transfer policies is assessed via a data interface and storable captured by a persistence repository unit of the parameter pattern-driven, data mining system. The digital policy at least comprises premium parameter values and/or deducible parameter values and/or risk-transfer type definition parameter values and/or policy limits parameter values and/or exclusion parameter values and/or riders/addit parameter values. The parameter pattern-driven, data mining system comprises a chained series of machine learning modeling structures automatically assessing and parsing digital risk-transfer policies of a policyholder, and automatically translating contractual language of the digital policy into actionable offers for the policyholder by generating appropriate new digital risk-transfer policies for automated under writing by the policyholder.

20 Claims, 25 Drawing Sheets

(51) Int. Cl.

| | |
|---|---|
| ***G06Q 10/0635*** | (2023.01) |
| ***G06Q 40/08*** | (2012.01) |
| ***G06Q 50/18*** | (2012.01) |

(56) References Cited

U.S. PATENT DOCUMENTS

| | | | | |
|---|---|---|---|---|
| 8,635,140 | B2 * | 1/2014 | Ziade | G06Q 40/08<br>283/57 |
| 9,946,879 | B1 * | 4/2018 | Sharifi Mehr | G06F 21/577 |
| 10,074,138 | B2 * | 9/2018 | Hughes | G06Q 40/08 |
| 2004/0236673 | A1 * | 11/2004 | Eder | G06Q 40/08<br>705/38 |
| 2013/0035964 | A1 * | 2/2013 | Roscoe | G06Q 40/08<br>705/4 |
| 2013/0046560 | A1 * | 2/2013 | Theus | G06Q 10/10<br>707/E17.014 |
| 2018/0165758 | A1 * | 6/2018 | Saxena | G06N 20/00 |
| 2020/0020038 | A1 | 1/2020 | Haile et al. | |
| 2022/0036467 | A1 | 2/2022 | Abedi et al. | |
| 2022/0164893 | A1 | 5/2022 | DiFranco | |

OTHER PUBLICATIONS

International Search Report and Written Opinion issued in related application No. PCT/EP2023/069634 mailed Oct. 6, 2023.

A. Vinothini et al. “Survey of machine learning methods for big data applications,” 2017 Internatonal Conference on Computational Intelligence in Data Science (IDDIDS), 2017, pp. 1-5.

* cited by examiner

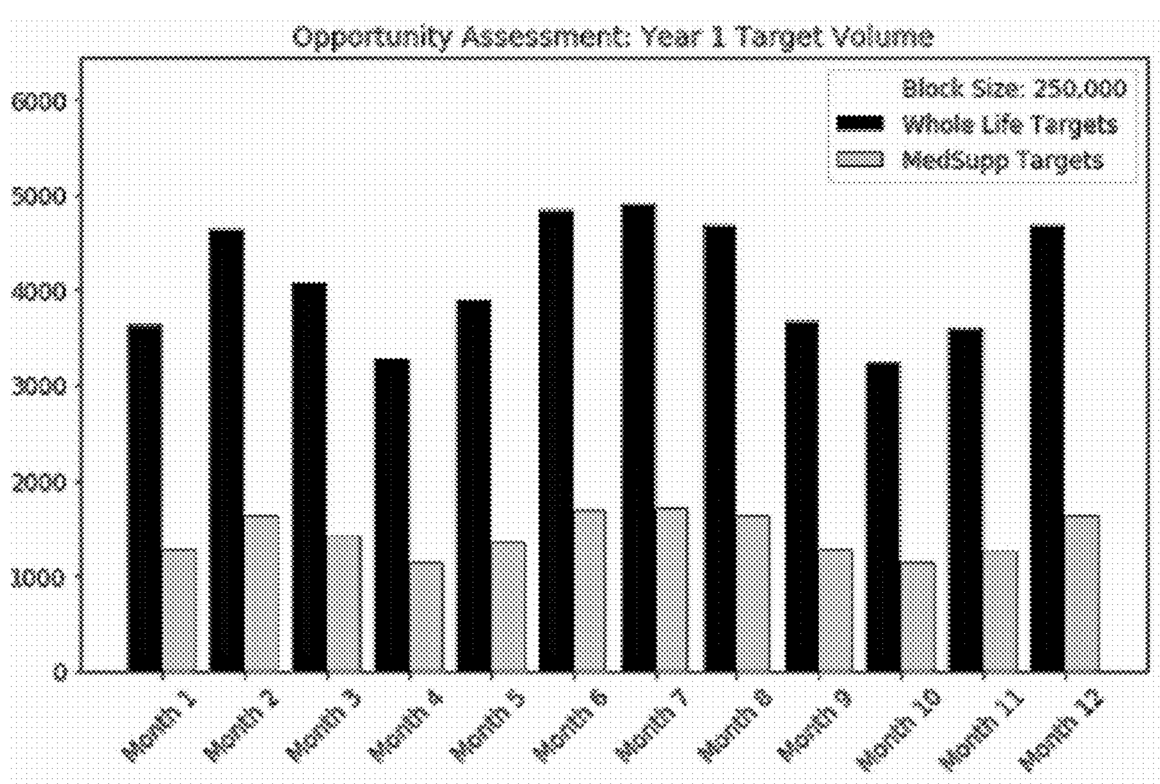
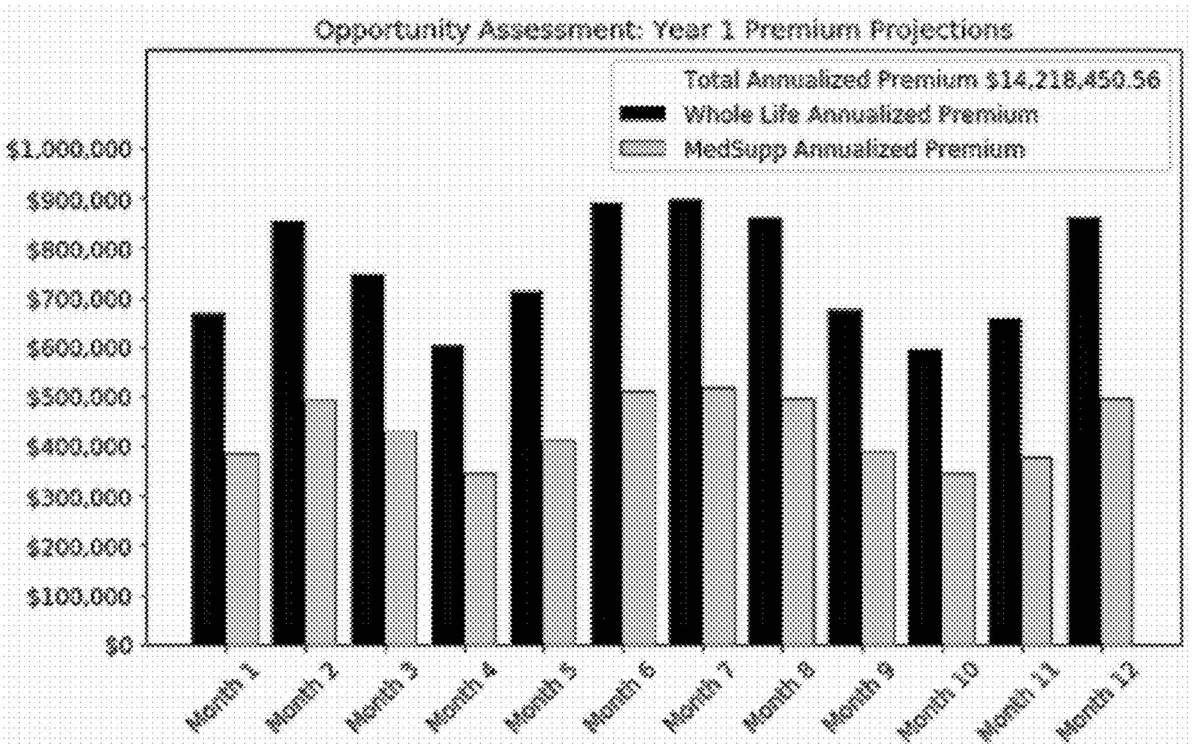
Fig. 11

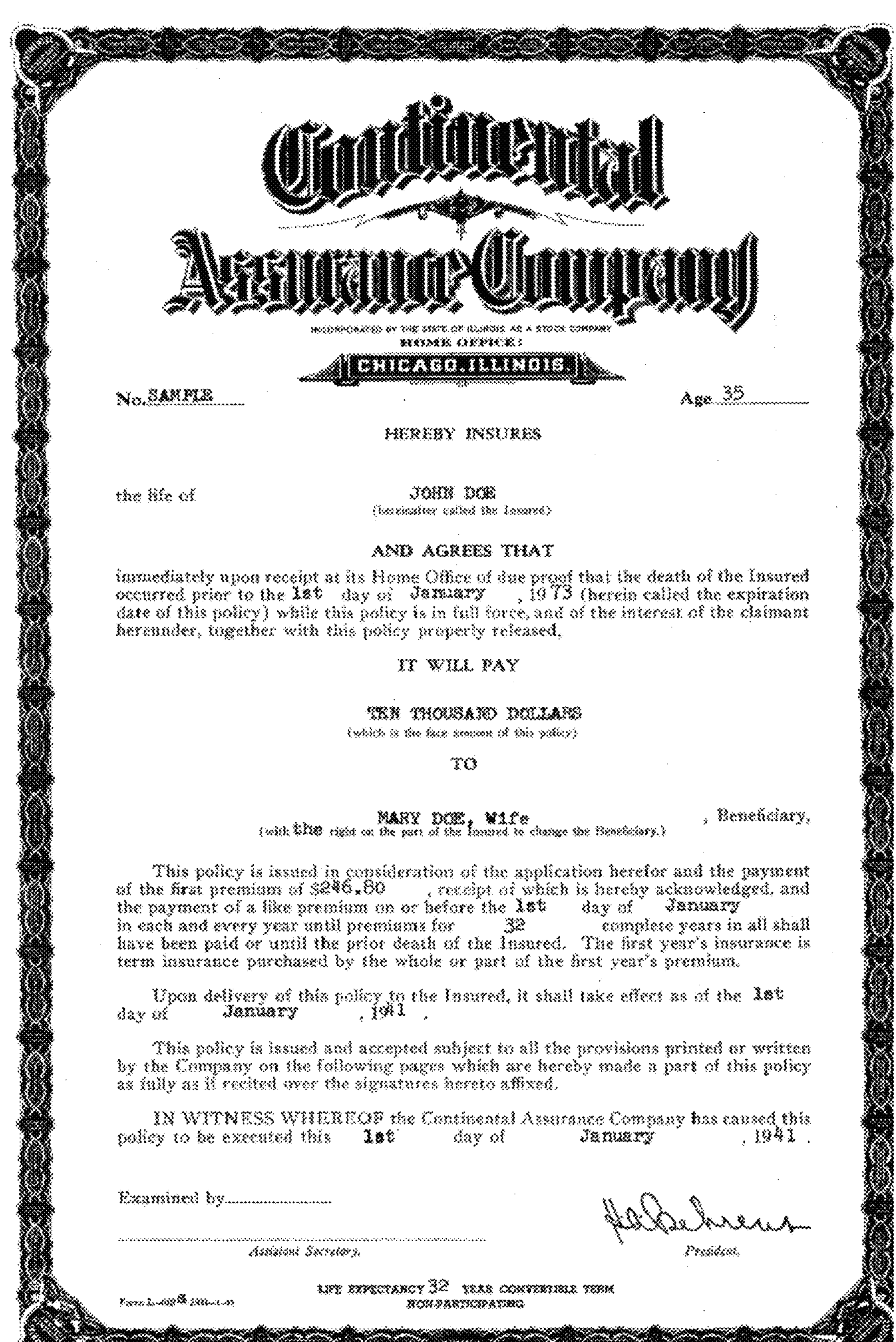

Continental Assurance Company

INCORPORATED BY THE STATE OF ILLINOIS AS A STOCK COMPANY
HOME OFFICE:
CHICAGO, ILLINOIS

No. SAMPLE Age 35

HEREBY INSURES the life of JOHN DOE
(hereinafter called the Insured)

AND AGREES THAT immediately upon receipt at its Home Office of due proof that the death of the Insured occurred prior to the 1st day of January , 1973 (herein called the expiration date of this policy) while this policy is in full force, and of the interest of the claimant hereunder, together with this policy properly released,

IT WILL PAY

TEN THOUSAND DOLLARS
(which is the face amount of this policy)

TO

MARY DOE, Wife , Beneficiary,
(with the right on the part of the Insured to change the Beneficiary.)

This policy is issued in consideration of the application herefor and the payment of the first premium of $246.80 , receipt of which is hereby acknowledged, and the payment of a like premium on or before the 1st day of January in each and every year until premiums for 32 complete years in all shall have been paid or until the prior death of the Insured. The first year's insurance is term insurance purchased by the whole or part of the first year's premium.

Upon delivery of this policy to the Insured, it shall take effect as of the 1st day of January , 1941 .

This policy is issued and accepted subject to all the provisions printed or written by the Company on the following pages which are hereby made a part of this policy as fully as if recited over the signatures hereto affixed.

IN WITNESS WHEREOF the Continental Assurance Company has caused this policy to be executed this 1st day of January , 1941 .

Examined by.........................

..........................................................
*Assistant Secretary.*

*President.*

LIFE EXPECTANCY 32 YEAR CONVERTIBLE TERM
NON-PARTICIPATING

Fig. 13

Conversion Period: To the earliest of the end of the Initial Term Period or the Policy Anniversary after Insured's 65th birthday. Minimum one (1) year conversion period

Address and phone number for Premium payment, inquiries and notification of claim:

AAA Life Insurance Company
[17900 N. Laurel Park Drive
Livonia, MI 48152-3985
1-800-624-1662]

Date Printed: [09/01/2018]

3

ICC19-1601

AUTOMATED, PARAMETER-PATTERN-DRIVEN, DATA MINING SYSTEM BASED ON CUSTOMIZABLE CHAIN OF MACHINE-LEARNING-STRUCTURES PROVIDING AN AUTOMATED DATA-PROCESSING PIPELINE, AND METHOD THEREOF

CROSS-REFERENCE TO RELATED APPLICATIONS

This application is a continuation of and claims benefit under 35 U.S.C. § 120 to International Application No. PCT/EP2023/069634 filed on Jul. 14, 2023, which is based upon and claims the benefit of priority under 35 U.S.C. § 119 from Swiss Application No. 000839/2022, filed Jul. 14, 2022, the entire contents of each of which are incorporated herein by reference.

FIELD OF THE INVENTION

The present invention relates to automated risk-related data-processing, in particular automated detection processes for risk-cover caps associated with risk-exposed individuals, and more particular to machine-learning data processing.

BACKGROUND OF THE INVENTION

Risk-transfer or risk mitigation is a useful instrument that allows to protect or fence individuals and/or their beneficiaries from the risk of loss, i.e. from the measurable probability of the occurrence of a specific event having a real-world impact on a particular individual or object. This is also true in the life risk-transfer technology. Although life insurance is useful reducing effect of unexpected vital accidents by sharing risk among a group of insurance members. Most people have significant gaps in the optimal cover of life risks, they are exposed to, of even do not realize its importance, its benefit, and also do not know which type of life insurance should be acquired due to variety and complexity in insurance types. One of the challenging tasks is to detect such cover gaps by technical means and to facilitate a customer to find a suitable and hopefully complete or optimal risk-transfer cover and type that matches his/her behavior and life-style pattern in order to gain the highest benefits and satisfactions. This invention provides a new technical approach on data mining techniques applied to automatically process and extract knowledge from life insurance databases. The invention covers the used data sources, mined knowledge and mining techniques.

However, due to the complex structures, risk-transfer technology and insurance is a technically challenging target field. Currently due to various conditions and needs, a large number of risk-transfer types and policies are developed and applied to risk exposure. With a suitable type and policy, the customer and/or his/her family can sufficiently obtain income when an unexpected inconvenient event, such as accident, sickness, or fatal death, takes place. Looking as a whole, sufficient risk cover can essentially reduce risk of both customers and insurance industry. However, as mentioned, life risk-transfer is especially technically challenging due to the difficulty of varying risk-transfer terminologies, complexity of risk-transfer policies and intricacy of benefit assessment. Typically, consulting proficiency is required to extract a customer's behavior and life-style from huge data in order to describe effect of each policy to the customer and to determine the level of coverage for an individual people.

Generally, shown here at the example of applied life risk-transfer structures (also referred to life insurance), such risk-transfer structures protect beneficiaries from a possibly occurring loss due to impacts caused by the occurrence of the death of a specified individual. Many different life risk-transfer plans are currently available. These structures can be classified into two general categories, "term life risk-transfer", and "whole life risk-transfer." Term life risk-transfer structures allow to capture coverage for a defined period, usually one year, in exchange for a premium. Some term life policies (a policy is the ensemble of risk-transfer parameters defining the risk-transfer structure for a specific event, loss, cover, monetary premium parameters and beneficiary/ies) fix the premium amount for a longer period, typically up to twenty years. Term life risk-transfer policies have no direct monetary value, whereas the second major type of risk-transfer structure, whole life risk-transfer, generally include an investment component in the premium which often allows the owner of the policy to borrow against the face value of the risk-transfer up to the monetary value that has vested in the policy or to surrender the policy for the monetary value. The risk-transfer industry also features a diverse number of variations on these two structures. Structures can include a variety of investment features, variable benefits, and so forth. Similar diverse considerations apply to other types of risk-transfer. Thus, the average individual is faced with both a daunting number of selectable risk-transfer structures as well as a large market of many insurance carriers, i.e. risk-transfer providers.

SUMMARY OF THE INVENTION

It is an object of the invention to provide an automated system and method that is able to provide automatically translating of contractual language of the digital policy and/or measuring data of the risk-exposed individual, inter alia also with an individual life score measure, into actionable risk-transfer offers for the policyholder by generating appropriate new digital risk-transfer policies for automated under writing by the policyholder. The system should further also be enabled to apply a digital, technical representation of an individual (body object with environmental linking to the ecosystem of the individual) including its contents and returns a cover score measure including breakdowns into individual perils and covers. The system further should be able to be self-trained through an understanding of historical experience and historical measuring data (e.g. to structure preferred classes or cohorts or segments of individuals), which forms a subset of what the system's modelling can predict. This has also the advantage, that it technically allows the system's measurements and predictions to be applied in situations with and without relevant historical experience, which is not possible by the known prior art systems. Thus, the system should be automatically based on the policy data associated with a risk-exposed individual and as a variant in conjunction with telematics and/or wearable and/or clinical measuring parameter values to automatically detect possible gaps in risk cover given by the risk-transfer of the policies based on the individuals risk exposure profile.

According to the present invention, these objects are achieved particularly through the features of the independent claims. In addition, further advantageous embodiments follow from the dependent claims and the description.

According to the present invention, the abovementioned objects are particularly achieved for the parameter pattern-driven, data mining system and method with an knowledge extraction engine based on a customizable chain of machine-learning-structures providing an automated pipeline for data processing of complex data structures with a hidden pattern detection for triggering automated underwriting processes, the underwriting processes covering a multitude of life/health risk and life/health peril measures associated with a life of an individual, in that a plurality of digital risk-transfer policies are assessed via a data interface and storable captured by a persistence repository unit of the parameter pattern-driven, data mining system, and wherein a digital policy at least comprises premium parameter values and/or deducible parameter values and/or risk-transfer type definition parameter values and/or policy limits parameter values and/or exclusion parameter values and/or riders/addit parameter values, and in that the parameter pattern-driven, data mining system comprises a chained series of machine learning modeling structures automatically assessing and parsing digital risk-transfer policies of a policyholder, and automatically translating contractual language of the digital policy into actionable offers for the policyholder by generating appropriate new digital risk-transfer policies for automated under writing by the policyholder. For assessing and parsing, the chained series of machine learning modeling structures can e.g. comprise one or more parser structures for selecting one of the digital risk-transfer policies of the persistence repository unit and parsing assessable characters, words and string of words of the selected digital policy into digital constituents by providing and storing a parse tree at least comprising location and/or size and/or font type and/or related attributes of every character in the selected digital policy. The chained series of machine learning modeling structures can e.g. comprise one or more recover structures recovering a structure of the selected digital policy by grouping words into coherent units of text at least comprising section headings and/or paragraphs and/or tables and/or other document artefacts or characteristics based on the output of the one or more parser structures. The chained series of machine learning modeling structures can e.g. comprise one or more identifier structures identifying elements of the selected digital policy containing language elements defining eligibility and/or other condition parameters indicating offers providable to a policy holder of the selected digital policy based on the output of the one or more identifier structures. The chained series of machine learning modeling structures can further e.g. comprise one or more linker structures translating and mapping the identified elements to one or more parameterized queries which are executed against a standardized database of customer data.

As an embodiment variant, the parameter pattern-driven, data mining system can e.g. comprise a learner component providing an open extractor process with a self-supervised learning of the semantic relations during processing the plurality of digital risk-transfer policies stored in the persistence repository unit. The learner component can e.g. comprise a pattern learner for classifying whether the shortest dependency path between two string of words or pattern of words indicate a semantic relation.

As another embodiment variant, the parameter pattern-driven, data mining system can e.g. comprise a matcher for constructing training and/or label data for the learner component by heuristically matching attribute-value pairs from the plurality of digital risk-transfer policies containing the assessable characters, words, and string of words. The matcher can e.g. seek a unique pattern to match an attribute value wherein to produce the best training set, the matcher performs at least three filtering: (i) skipping an attribute value completely when multiple parts of a digital policy match the attribute value or an equivalent attribute, (ii) rejecting a pattern if the attribute value is not heads of the phrases containing them, and (iii) discarding pattern if the attribute value does not appear in the same clause (or in parent/child clauses) in the parse tree.

As an even further embodiment variant, the digital risk-transfer policies comprise life risk-transfer structures at least can e.g. comprise term life risk-transfer structures and/or whole life risk-transfer structures and/or health risk-transfer structures and/or critical health risk-transfer structures. The policyholder, as a risk-exposed individual captured by a cover provided by life risk-transfer structures comprised by a digital risk-transfer policy, can e.g. be associated with wearables comprising bodily and environmental sensory devices and/or wearable telematics sensory devices and/or the individual can e.g. be associated with measured laboratory and/or clinical measuring parameter, wherein measuring parameter values of the wearables and/or the telematics sensory devices and/or the measured laboratory and/or clinical measuring parameter are assessed via a data interface and storable captured by a persistence repository unit of the parameter pattern-driven, data mining system, and wherein the chained series of machine learning modeling structures additionally and in conjunction with the digital data of the risk-transfer policies automatically assesses and process said measuring parameter values, automatically translating the processed data into actionable offers for the policyholder by generating appropriate new digital risk-transfer policies for automated under writing by the policyholder. The measured laboratory and/or clinical measuring parameter values can e.g. be measured periodically and/or upon request by the digital system. A at least one hardware controller can e.g. be in communication with the plurality of sensory or laboratory measuring devices, the sensory devices transmitting sensory signals (in particular real-time sensory signals) to the hardware controller, wherein the measuring and monitoring system comprises a digital raw layer for capturing raw sampling signals comprising at least sensory data of the sensory devices and physical condition data measuring real world physical conditions related to the individual. The automated measuring and monitoring and/or automated system can e.g. comprise a signal conditioning circuitry for processing the captured raw sampling signals into convertible digital values and wherein the digital raw layer provides secure retrieval of the measured and/or captured convertible digital values. The automated digital system can e.g. comprise a calibration layer with an abstract digital representation of the individual, the calibration layer comprising a first calibration structure modelling static properties parameters related to the individual based on the abstract digital representation and the captured digital values of the digital raw layer, a second calibration structure modeling dynamic properties based of the individual on the abstract digital representation and the captured digital values of the digital raw layer, and a third calibration structure modeling lifestyle behavior and characteristics of the individual based on the abstract digital representation and the captured digital values of the digital raw layer. The automated digital system can e.g. further comprise a risk-event or peril indexing layer splitting the risk events or perils to be measured into various individual risks or perils comprising at least life span impacting events and/or death impacting perils and/or life pattern perils and/or health pattern perils, and generating an individual life or life span score measure for each of the individual risks and/or perils, the individual life score measures providing indexing measures measuring the respective occurring event or condition physically being linked to the life-span or life-span reducing health condition of the individual. The captured raw sampling signals can e.g. comprise at least sensory data transmitted to the hardware controller from the sensory devices associated with the individual and/or individual condition data and/or perils-related condition data and/or life-span impacting related sensory data and/or health related sensory data and/or clinical and/or laboratory and/or telematic measured/captured and related monitoring data, wherein the raw sampling signals measure real world physical conditions related to the individual and wherein the automated digital system comprises a signal conditioning circuitry for processing the captured raw sampling signals into convertible digital values and providing secure retrieval of digital values. The captured raw sampling signals can further e.g. comprise measuring parameters measuring the occurrence of life-span impacting events at least comprising health-related measuring parameters and/or regularly monitored clinical measuring parameters and/or real-time captured telematics measuring parameters and/or regularly monitored laboratory measuring parameters. The captured raw sampling signals can e.g. comprise measuring parameters measuring the occurrence of life-risk and life perils events in dependence to preferred classes or cohorts of associatable individuals characteristics parameters and/or family composition characteristics parameters and/or individual body structure characteristics parameters. The captured raw sampling signals can e.g. comprise measuring parameters measuring the occurrence of life and/or health perils associated with life patterns in dependence to routines characteristics parameters and/or activity/inactivity parameters and/or expected social event parameters and/or social change/forecast parameters. The captured raw sampling signals can e.g. comprise measuring parameters measuring the occurrence of life risks and/or perils, the life risks/perils at least comprising measuring parameters related to health risk-events and/or measuring parameters related to medical events and/or measuring parameters related to clinical events and/or measuring parameters related to chirurgical events having a measurable probability of impacting the life-span of the individual. Finally, the captured raw sampling signals can e.g. comprise measuring parameters measuring the occurrence of life risk-event or life perils using appropriate smart devices and/or in connection with IoT data capturing and/or data transmission, wherein the automated system can e.g. comprise at least one processor for receiving over the communication of the hardware controller, by the at least one processor, a plurality of communications sent from a plurality of Internet-of-Things (IoT) devices on a network, the IoT-devices comprise at least the plurality of sensory devices, wherein each communication describe operations of a respective IoT device, wherein, by the at least one processor, based on the plurality of communications, a model structure of an operational state for at least one of the plurality of IoT-devices is determined, wherein, by the at least one processor, an operational deviation of the at least one IoT-device compared to the model structure is measured, and wherein, in response, an adaption of a raw sampling measuring parameter of the digital raw layer based on the operational deviation of the at least one IoT device is conducted. The presence of a new IoT device can e.g. be automatically detected and added to the network, wherein, by the at least one processor, the model structure is modified based on the presence of the new IoT device on the network. In an embodiment variant, the individual life score measures of the life-risk and/or peril indexing layer can e.g. be dynamically adapted by means of the automated system. In a further embodiment variant, the life risk and/or peril indexing layer can e.g. comprise representation and/or monitoring means grouping individual safety score measures and alerts monitoring, wherein the monitoring at least comprises environmental perils related individual life score measures and alerts and/or life-risks or perils related individual life score measures and alerts and/or life-style associated risks/perils related individual life score measures.

In an embodiment variant, the raw sampling signals can e.g. comprise at least condition data capturing risk-transfer conditions related to risks/peril coverage parameters and/or risks-events/peril exclusion parameters and/or deductibles parameters and/or claim parameters and/or time period of coverage parameters. For example, by means of the at least one processor, the operational deviation of the at least one IoT device is compared to the model structure of an operational state, and, in response, at least one cost parameter value comprised in the lie risk/peril coverage parameters is determined based on the operational deviation of the at least one IoT device, wherein the at least one cost parameter value relates to monetary premium parameters for conducting a risk-transfer for the peril coverage. By means of the at least one processor, a risk-transfer policy can e.g. be automatically based on the cost parameter value and a premium parameter value to be transferred in response to the operational deviation. Further, by means of the at least one processor, a signal can e.g. be transmitted to transfer a value related to the premium parameter value to an account that is associated with the coverage. The presence of a new IoT device can e.g. be automatically detected and added to the network, wherein, by the at least one processor, the model structure is modified based on the presence of the new IoT device on the network. By means of the at least one processor, the risk-transfer policy can e.g. be automatically modified based on the presence of the new IoT device on the network.

In another embodiment variant, the automated system can e.g. comprise an additional machine learning (ML) structure, wherein an individual life score measure for the life pattern perils is generated the step of pattern recognition of life patterns associated with measuring parameters of the captured raw sampling signals measuring comprising routines characteristics parameters and/or activity/inactivity parameters and/or expected social event parameters and/or social change/forecast parameters, and linking said life patterns to an individual life score value by means of the machine learning (ML) module. The machine learning (ML) module can e.g. comprise at least one artificial intelligence (AI) unit. Further, the pattern recognition of life patterns can e.g. comprise a first step of clustering measured life patterns and assigning a value to the individual life score associated with the life pattern perils based on a second step of classifying the measured and recognized clusters.

The inventive digital system and method has, inter alia, the advantage, that it provides automatically translating of contractual language of the digital policy and/or measuring data of the risk-exposed individual, inter alia also with an individual life score measure into actionable offers for the policyholder by generating appropriate new digital risk-transfer policies for automated under writing by the policyholder. The system can e.g. further technically apply a digital, technical representation of an individual (body object with environmental linking to the ecosystem of the individual) including its contents and returns a safety score measure including breakdowns into individual perils and covers. The system further allows to be validated and trained through an understanding of historical experience and historical measuring data (e.g. to structure preferred classes or cohorts or segments of individuals), which forms a subset of what the system's modelling can predict. This has also the advantage, that it technically allows the system's measurements and predictions to be applied in situations with and without relevant historical experience, which is not possible by the known prior art systems.

BRIEF DESCRIPTION OF THE DRAWINGS

The present invention will be explained in more detail below relying on examples and with reference to these drawings in which:

FIG. 11 shows a diagram, schematically illustrating that the signaling output can e.g. be presented by the system based on the principal of continuous engagement. For example, targets and premium potential can be shown in the time periods indicated by the time triggers created by the electronic offer engine.

FIG. 13 shows a diagram, schematically illustrating by an example that every life insurance contract typically contains legal clauses that delineate offers that can be made to customers. Examples include product conversions, face amount increases, and rider expirations. Each offer can be made to a particular customer if they meet the eligibility and related conditions, as set out in the relevant contractual language.

DETAILED DESCRIPTION OF THE PREFERRED EMBODIMENTS

Figure 1:
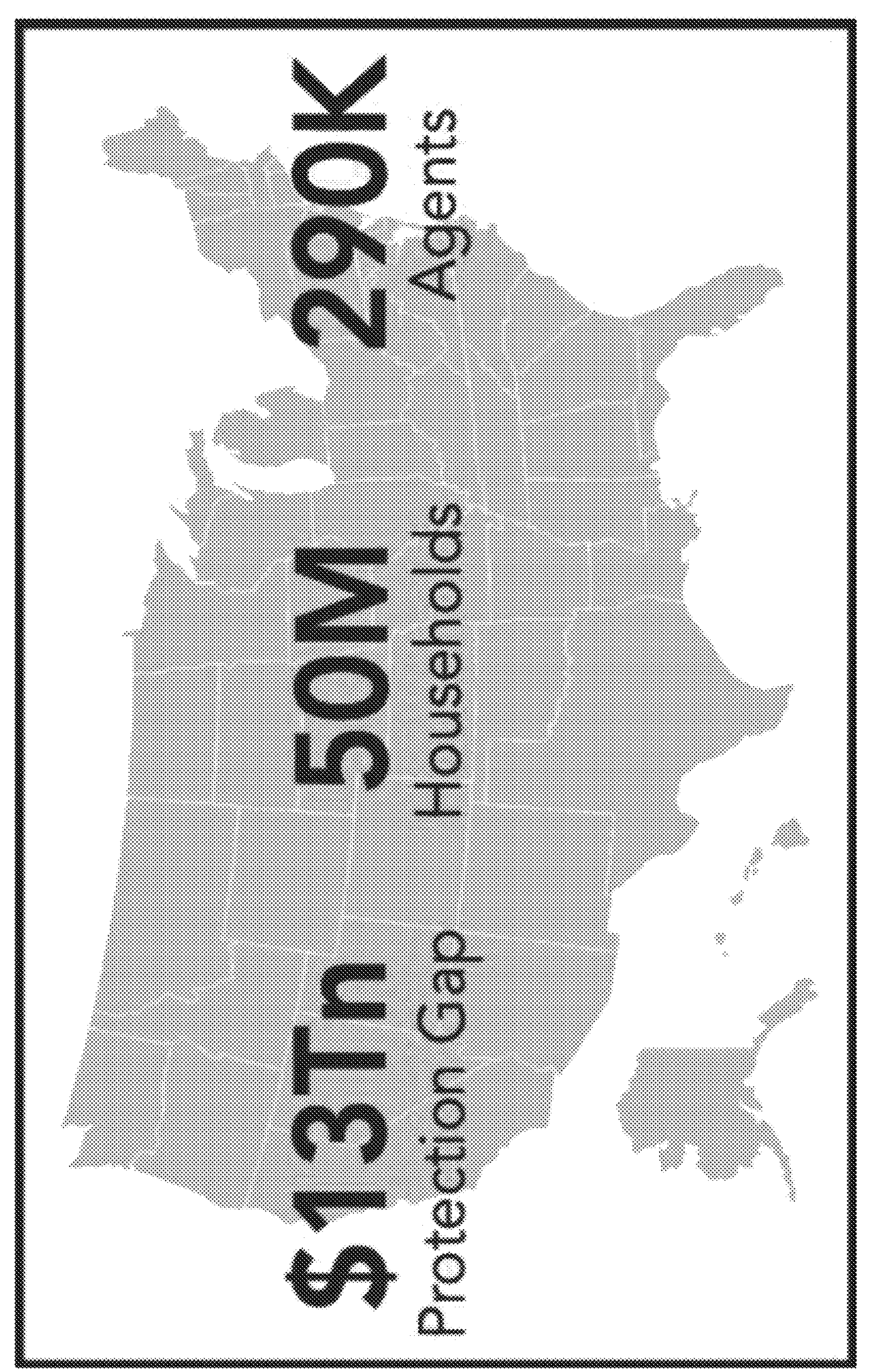
FIG. 1 shows a diagram, schematically illustrating the size of the drawback of the prior art systems making the present invention a vital technical instruments for the risk-transfer industry. Estimates show that $13T of the protection gap in the United States is related to customers that own some but not enough life risk cover. This translates to 50 million households whose undetected and uncovered risk-cover needs for measurable risk exposures of those individuals have not been fully serviced.
Figure 2:
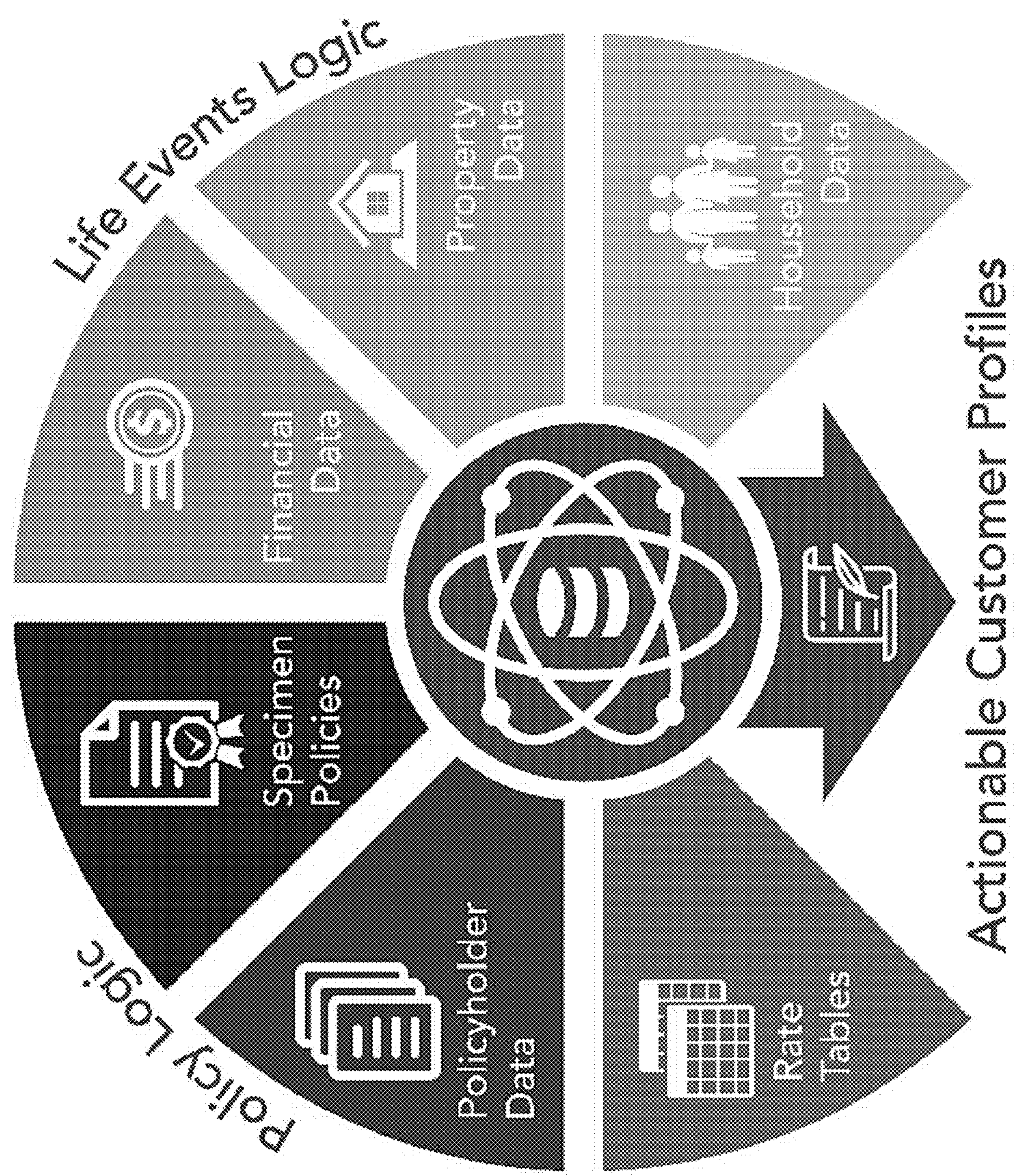
FIG. 2 shows a diagram, schematically illustrating the data science layer. At the heart of the present digital system is a sophisticated data science layer. The data science layer captures and/or monitors and/or ingests data and produces an actionable customer profile with personalized risk-cover offerings. Not included in FIG. 2 are measuring data, which as embodiment variant can be captured by wearables and/or telematic measuring devices and/or clinical measuring devices.
Figure 3:
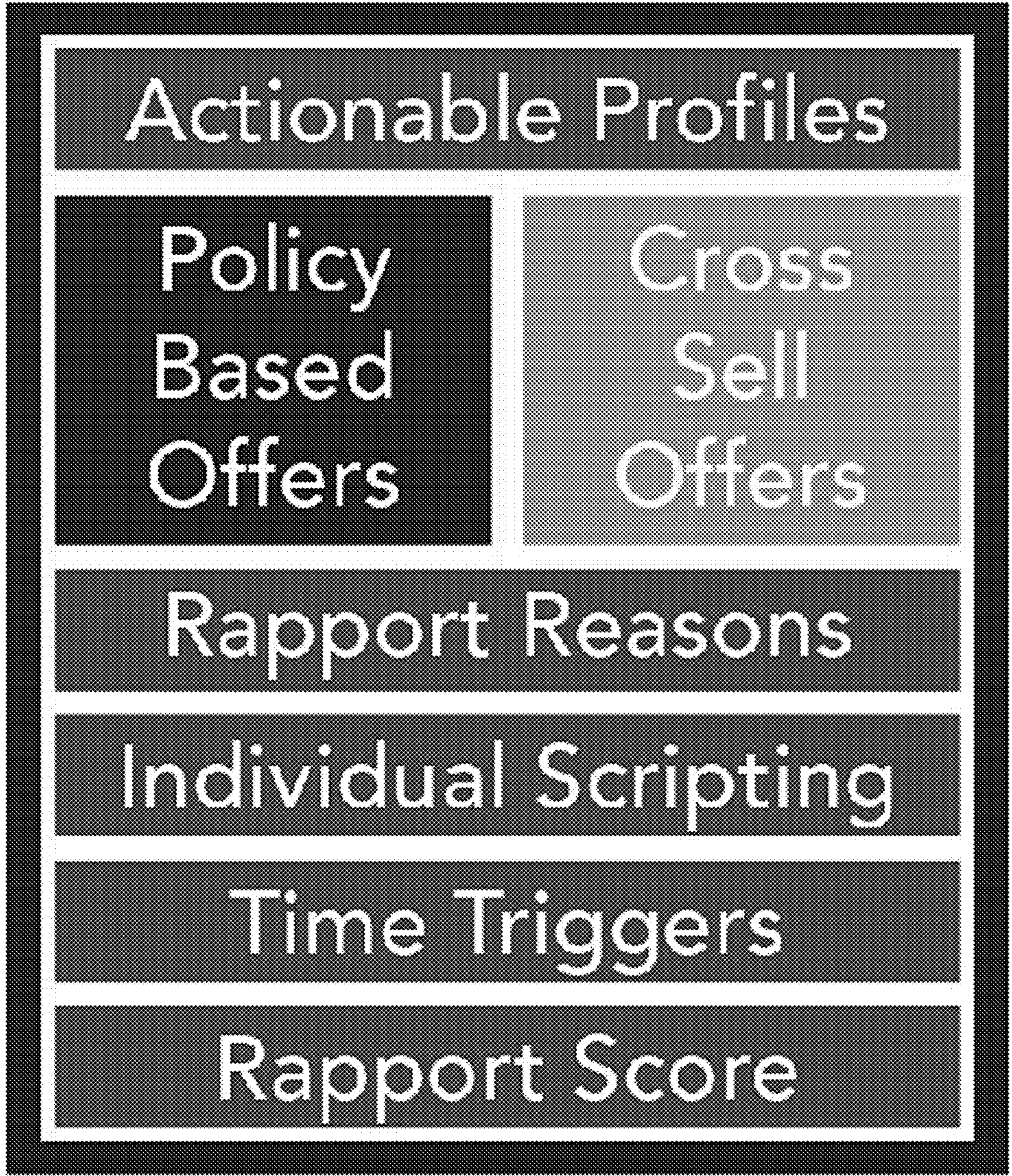
FIG. 3 shows a diagram, schematically illustrating a possible realization of a part of a user interface to the inventive system: The output of the Data Science Layer is a packaged parameter and expert opinion set denoted as "Lead" that can contain the following elements: (i) A rich and actionable individual/customer profile; (ii) An ordered set of policy based offers for risk cover e.g. term conversion, rider expiration; (iii) In ordered set of cross sell offers e.g. medicare supplement; (iv) Rapport reasons for each offer to help the agent demonstrate the need for the product; (v) Individualized scripting to show the agent how to deliver each offer; (vi) A set of time triggers to tell the agent when to reach out to the customer; (vii) A rapport score which shows the agent how likely the customer is to purchase.
Figure 4:
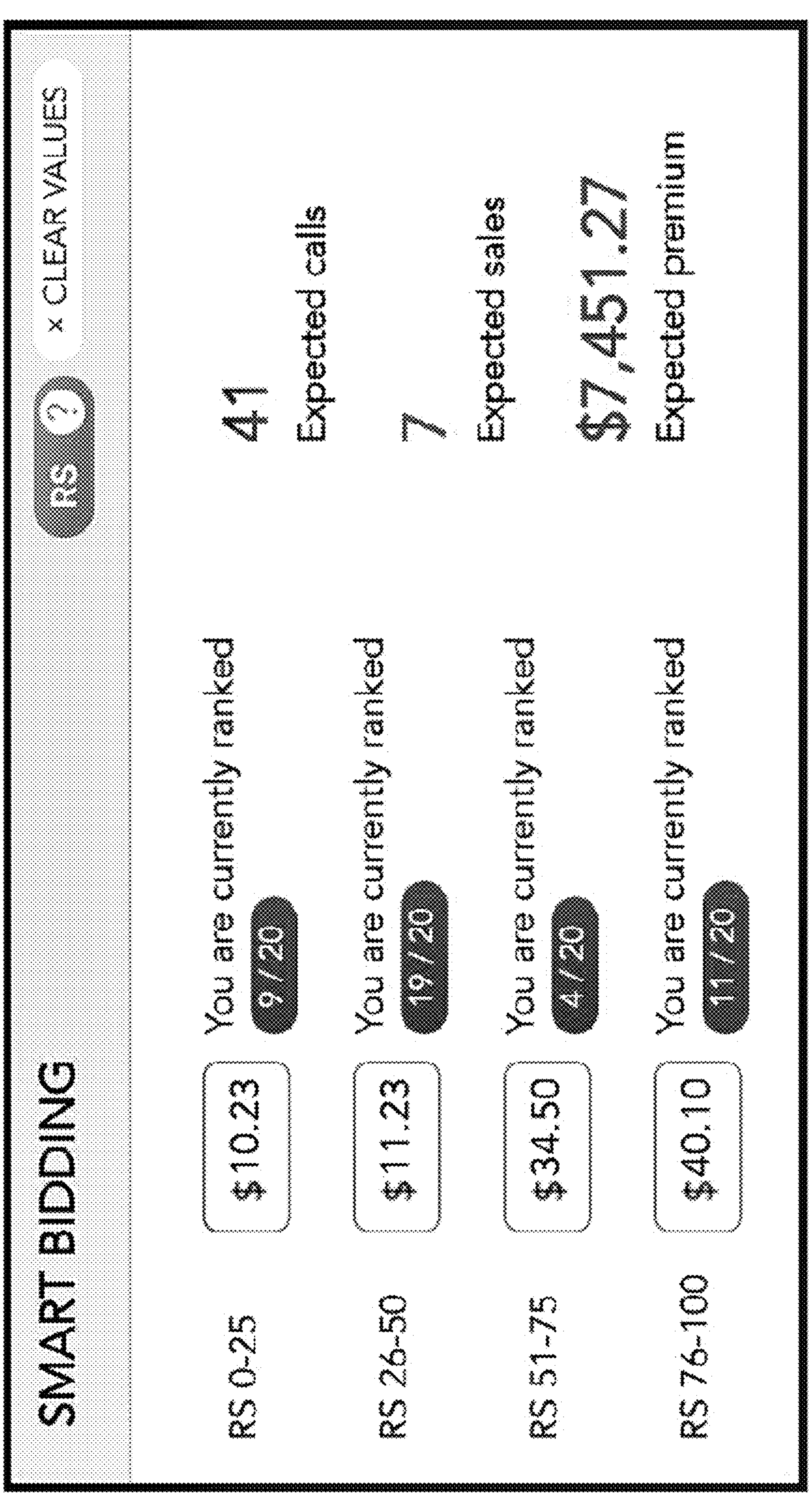
FIG. 4 shows a diagram, schematically illustrating the lead distribution: The inventive system provides a one-of-a-kind lead distribution mechanism that can bring market discipline to the way that leads can be distributed to agents. Agents can bid a portion of their commission in a competitive auction. They can bid to win the right to work on leads with a particular conversion potential as encapsulated in a score measure provided by the system, also referred herein as "rapport score". Via a user interface, agents can be automatically provided with feedback about the results of their bidding strategy in real time. Using the interface, they are able to update their bids throughout the day in order to achieve their own personal production goals.
Figure 5:
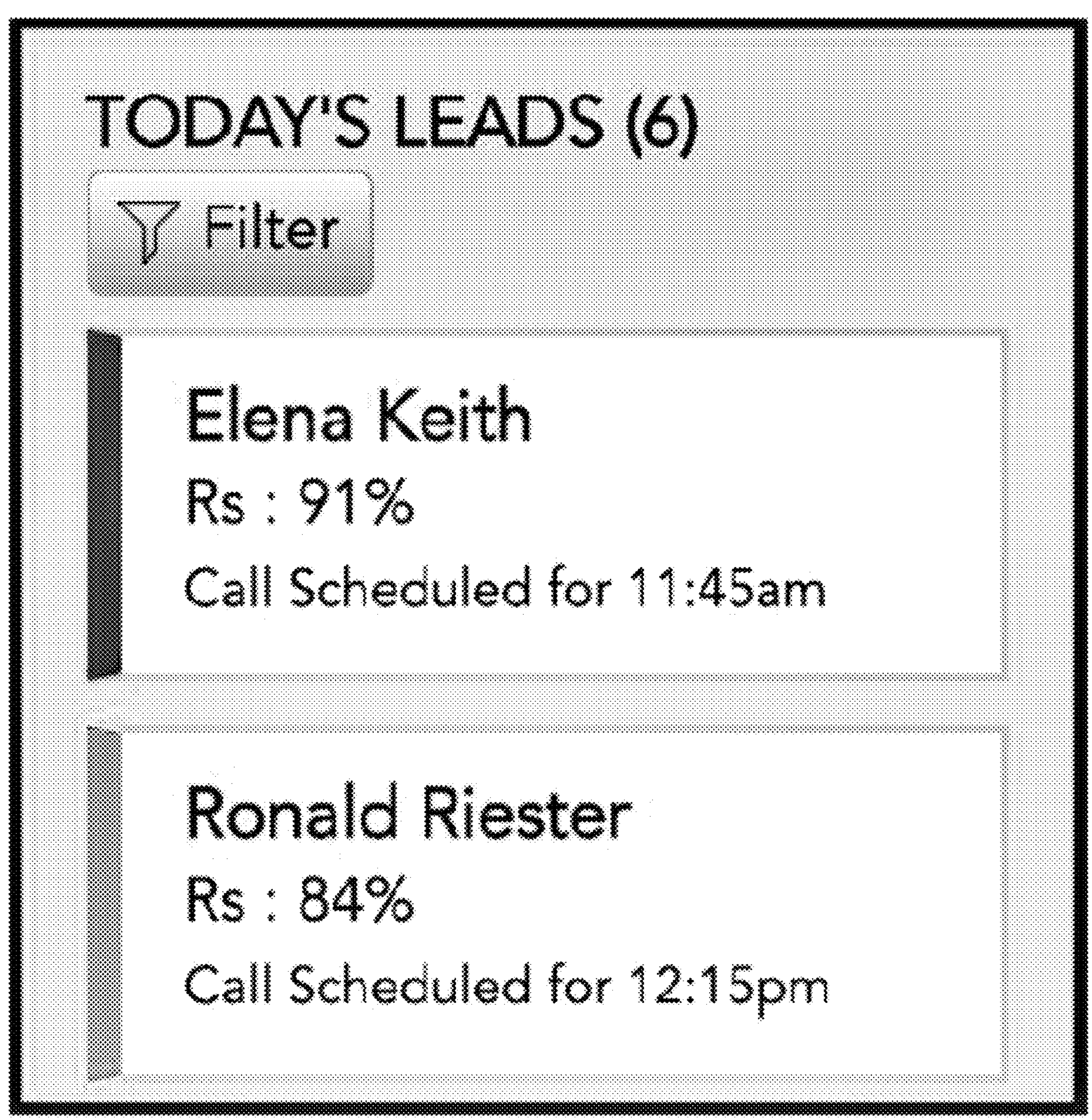
FIG. 5 shows a diagram, schematically illustrating how leads are fed to a custom graphical interface that manages the agent work pipeline, allows them to set production goals and lead bidding strategy, and keeps track of their interactions with customers/individuals.
Figure 6:
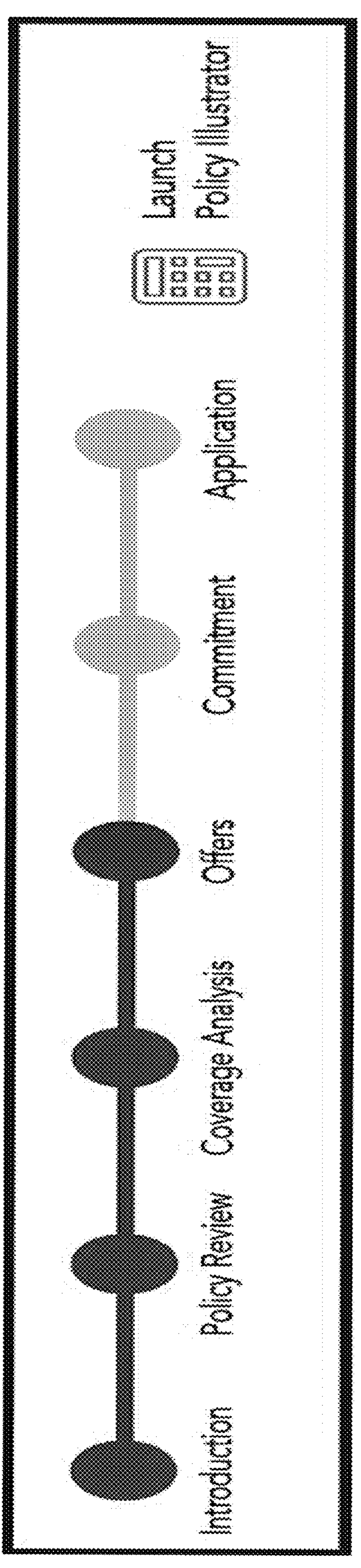
FIG. 6 shows a diagram, schematically illustrating the inventive system providing an intuitive, state of the art guided sales process that incorporates the individual offers, rapport reasons, and scripting ensures a high probability of success at each step of the sales journey.
Figure 7:
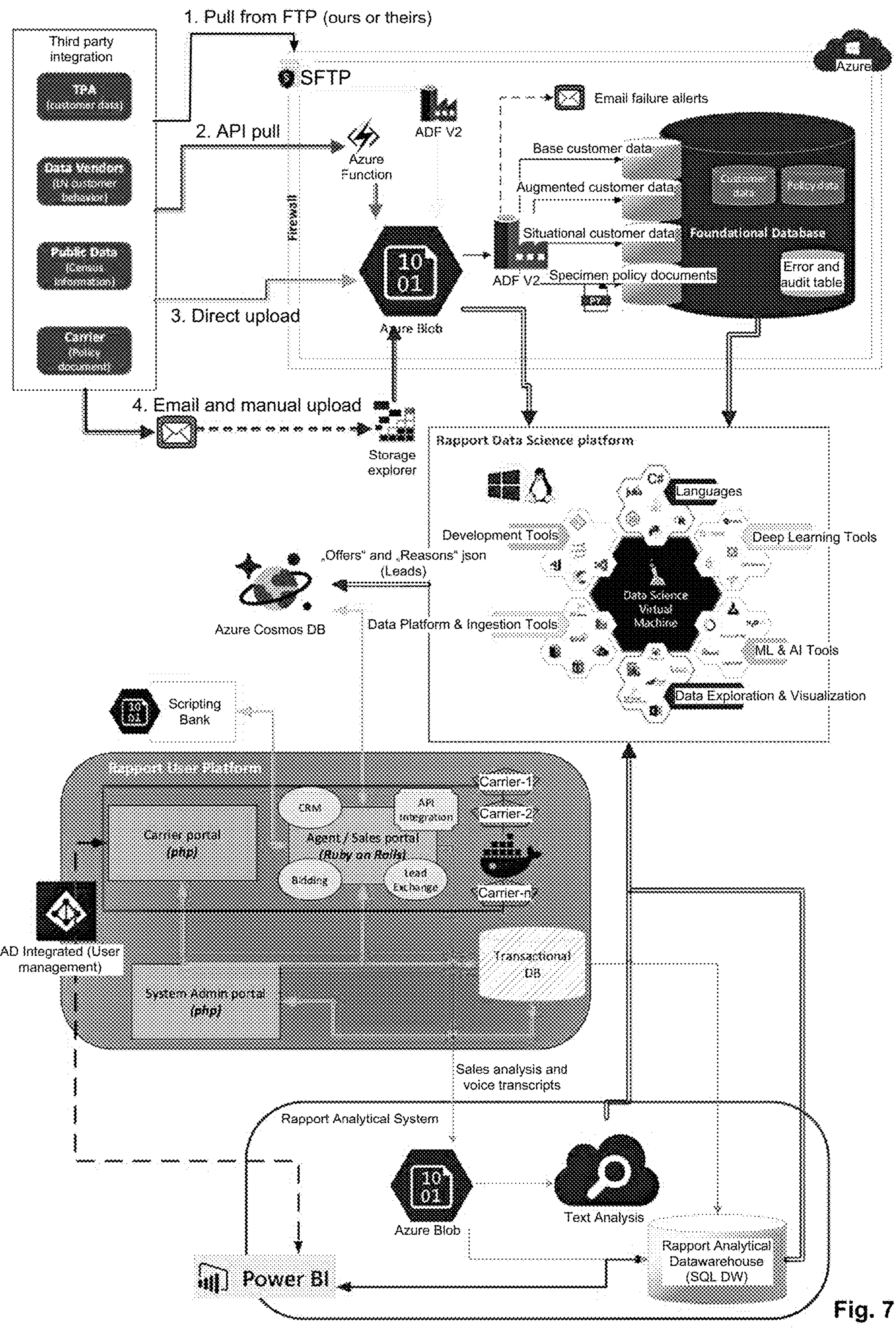
FIG. 7 shows a diagram, schematically illustrating the technical architecture of the present invention being modular and highly scalable and incorporating best practice data governance and security. The digital system, as such, is also referred to as "rapport system", due to its capability of providing technically generate intelligent feedback and monitoring information. The solution can e.g. be hosted on the Microsoft Azure Cloud or the like. The invention's architecture is divided into three core modules, namely (i) the data housing, (ii) the data science layer, and (iii) the digital sales and/or market platform.
Figure 8:
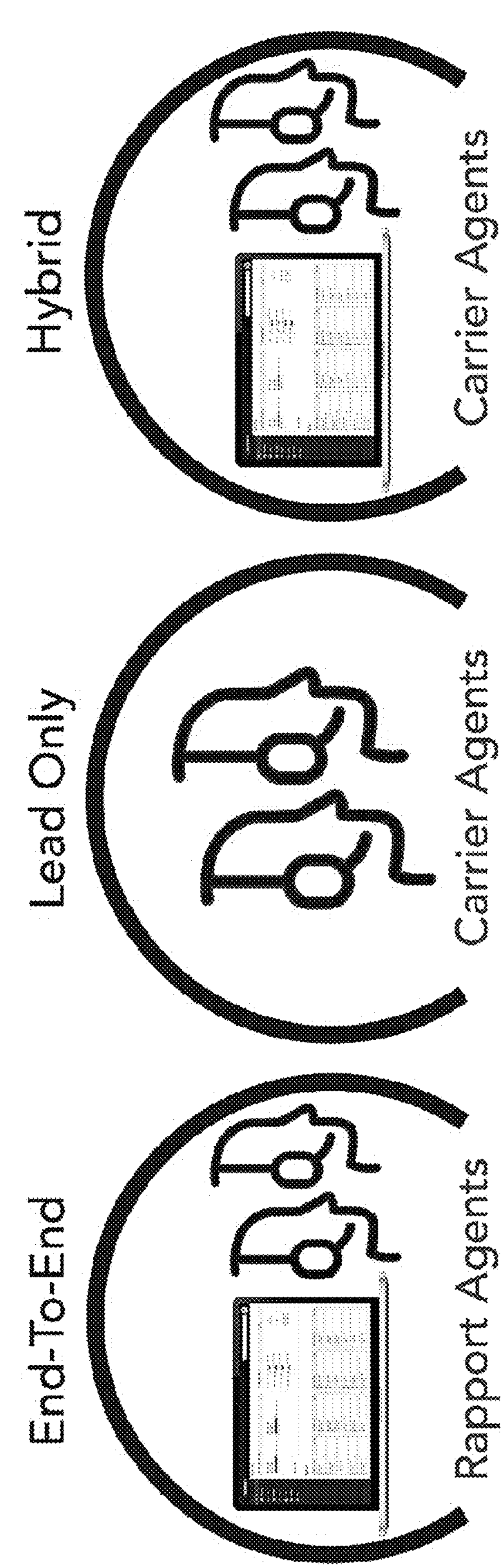
FIG. 8 shows a diagram, schematically illustrating that the inventive system can e.g. be implemented by three different implementation models based on the necessities of the users/clients of a system provider; (i) an end-to-end implementation, (ii) a lead only implementation, and (iii) a hybrid implementation. In general, the difference between the implementations is the degree to which the inventive system manages sales execution.
Figure 9:
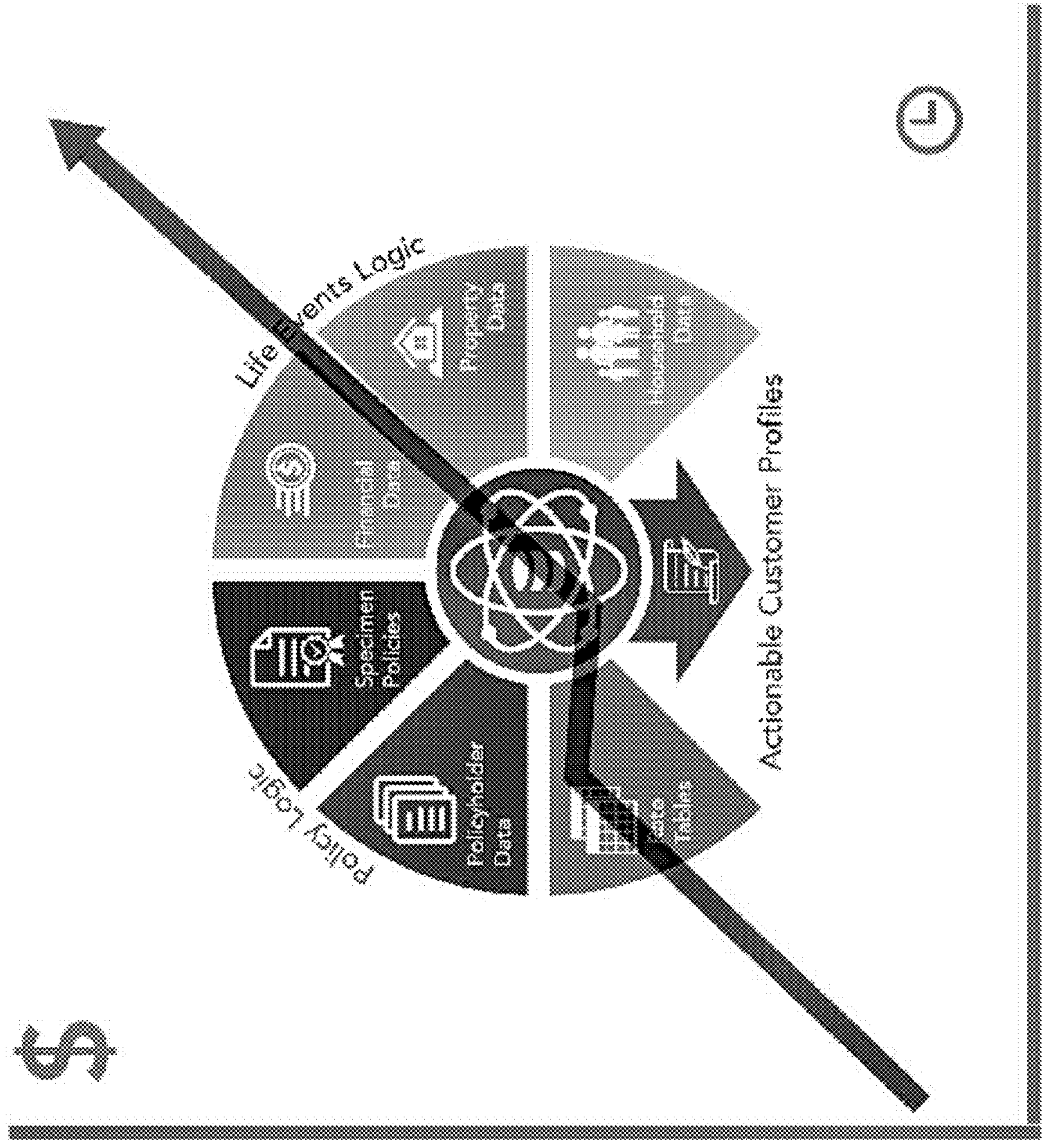
FIG. 9 shows a diagram, schematically illustrating the ever changing customers' needs as embedded input and part of the present digital system's design. The inventive system can e.g. be continually monitoring the customer data, identifying opportunity as it arises. The data processing structures and algorithms in the data science layer can be executed on a daily basis generating new offers, updating rapport reasons and reengineering, or continuously adjusting time triggers. This means that for a sizable block of existing customers new opportunities can be generated e.g. daily for months or even years. An engagement with the inventive system thus has the advantage of a continuous flow of opportunity and revenue.

FIGS. 1-24 schematically illustrate an architecture for a possible implementation of an embodiment of the inventive parameter pattern-driven, data mining system with a knowledge extraction engine. The knowledge extraction engine is based on a customizable chain of machine-learning-structures providing an automated pipeline for data processing of complex data structures with a hidden pattern detection for triggering automated under-writing processes. A plurality of digital risk-transfer policies is assessed via a data interface and storable captured by a persistence repository unit of the parameter pattern-driven, data mining system. A digital policy at least comprises premium parameter values and/or deducible parameter values and/or risk-transfer type definition parameter values and/or policy limits parameter values and/or exclusion parameter values and/or riders/addit parameter values. The parameter pattern-driven, data mining system comprises a chained series of machine learning modeling structures automatically assessing and parsing digital risk-transfer policies of a policyholder, and automatically translating contractual language of the digital policy into actionable offers for the policyholder by generating appropriate new digital risk-transfer policies for automated under writing by the policyholder.

The present invention provides a digital solution that enable insurers to unlock the value of their existing customers. It does so by giving carriers the ability to engage with their customers on a one-to-one basis, at scale. The inventive digital system enabled additional contacts to existing customers having a conversion rate 14 times higher than campaigns still relying on traditional methods. Typically, insurance carriers suffer from a fundamental inability to talk to existing policyholders. The information needed to have an engaging service-oriented conversation with customers is locked away in complicated policy documents, unconnected data sets, and legacy systems. Marketing to existing policyholders is so hard that insurers neglect the ever-changing needs of their customers. This leaves on the table a massive opportunity to grow customer value through further product sales.

The present invention tackles the problem on a technical digital basis at the heart of this deadlock by parsing and automatically processing specimen policies, connecting internal policyholder data, in particular by generating appropriate meta-data, and capturing and aggregating relevant third party data. A sophisticated data science layer processes this data and creates actionable individual profiles with "just-in-time" product (risk-transfer structure) offers that are tailored to each individual. The present invention goes further by providing these offers in a graphical digital market/sales platform usable by agents. The inventive sales platform has at its core a guided sales process that allows to maximize conversion by showing agents exactly when and how to deliver each offer. Individualized scripting based on behavioral science makes the conversation fluid and individual focused. The result can be up to a 14 factor increase in conversion.

The size of the drawbacks resulting from the use of the known prior art systems can make the present invention an essential and technical instrument for risk-transfer providers. Estimates show that $13T of the protection gap in the United States is related to customers that own some but not enough life risk cover. This translates to 50 million households whose risk-transfer needs cannot and are not fully covered by traditional methods. These individuals are virtually costless to contact. Providing them the protection they need is significantly cheaper and more efficient than acquiring new customers. Every other industry on earth drives revenues and persistent growth by marketing to existing customers. With the present automated system, the life risk-transfer industry is technically enabled, i.e. by technical means, to cover the drawbacks of the prior art systems.

The inventive system, inter alia, introduces a basic technical concept and framework for applying data mining concept for knowledge discovery in risk-transfer technology. In clustering, it can e.g. use K-Means in order to give an example in case of an individual does not have any predefined any labels. The inventive system presented based on the outcome of the grouping will target the different groups for particular types of policy. The inventive system can e.g. also use K-means clustering to classify the customer group from demographic data which is quite more different features it not only uses basic information as name, gender, birth date but also included life stage needs, residential house level, life partner, and transportation mode. Depth details of features can distinguish classification of customer groups more clearly.

Data science layer: At the heart of the present digital system is a sophisticated data science layer. The data science layer captures and/or ingests data and produces an actionable customer profile with personalized risk-cover offerings.

Policy logic: Specimen contracts are processed using character recognition and natural language processing. The result is a matrix of policy logic that determines what "Policy Based Offers" an individual is eligible for based on the policy they already own. This policy logic is complimented with a basic set of policyholder data.

Life Events Logic: The present invention allows to pull in 3rd party data that helps the platform to learn more broadly about the life of the individual. The result is a matrix of life events logic that is used to generate "Cross Sell Offers".

Offer Engine: The Offer Engine comprises a series of custom algorithms and data-processing structures that run over these pools of data and logic on a daily basis, identifying opportunity as it arises. The engine generates an ordered set of actionable offers along with a set of time triggers that represent the optimal moment to contact a customer/individual. The Offer Engine also produces and/or generates a number of expert opinions denoted as "rapport reasons" for each offer. These are ordered, personalized reasons the customer should engage with each risk-transfer cover offered. Finally an inventive score measure denoted as "rapport score" is generated. The score measuring index can e.g. be defined to range from 0 to 100 and is a reflection of how much effort a salesperson will need to expend in order to convert the risk-cover potential of an individual/customer into monetary premiums.

Dynamic Scripting Engine: A powerful behavioral science based scripting engine automatedly matches elements from the individual/customer profile and the personalized offers to scripting that shows a sales agent exactly how to approach the conversation with the individual.

Lead Packaging: The output of the Data Science Layer is a packaged parameter and expert opinion set denoted as "Lead" that can contain the following elements:

- A rich and actionable individual/customer profile
- An ordered set of policy based offers for risk cover e.g. term conversion, rider expiration
- An ordered set of cross sell offers e.g. medicare supplement
- Rapport reasons for each offer to help the agent demonstrate the need for the product
- Individualized scripting to show the agent how to deliver each offer
- A set of time triggers to tell the agent when to reach out to the customer
- A rapport score which shows the agent how likely the customer is to purchase Lead Distribution: The inventive system provides a one-of-a-kind lead distribution mechanism that can bring market discipline to the way that leads can be distributed to agents. Agents can bid a portion of their commission in a competitive auction. They can bid to win the right to work on leads with a particular conversion potential as encapsulated in the rapport score. Agents are automatically provided with feedback about the results of their bidding strategy in real time. They are able to update their bids throughout the day in order to achieve their own personal production goals. This method of lead distribution supports ensuring that all leads in a campaign are worked. Agents are incentivized to tackle harder leads as they can earn more commission by doing so.

Newer agents may tackle "easier" leads by bidding more for them than their more experienced colleagues. The result is that conversion increases due the efficiency gains the bidding mechanism brings to the way leads are distributed.

The inventive system's digital market and/or sales platform: Leads are fed to a custom graphical interface that manages the agent work pipeline, allows them to set production goals and lead bidding strategy, and keeps track of their interactions with customers/individuals. The inventive system provides an intuitive, state of the art guided sales process that incorporates the individual offers, rapport reasons, and scripting ensures a high probability of success at each step of the sales journey.

The digital platform includes policy illustration capabilities to allow agents to simulate different premium/face amounts with the customer. Agents can keep track of their long term performance and compare themselves with their peers using Tableau style dashboards. Once an agent has a commitment to buy from a customer an API call is made to the service that hosts the application form for the product to be sold.

The success of a marketing campaign to existing policyholders is a function of the velocity of sales an agent can make, and the probability of being successful at each point of the sales process. This notion can be captured by the following expression:

$$\$=f(\text{Velocity},\Pi P(\text{Success}_c)$$

The present invention allows to increase both the inputs to the function. Agent prep time is reduced as all the required pre-call work is achieved instantaneously. They are more likely to be successful at each step of the process as the offers, timing and scripting are personalized to each customer. A side by side comparison of the velocity and probability of success in traditional campaigns and the present invention enabled campaigns shows how this function translates into success, as shown in the following tables 1a and 1b.

| Traditional Sales | | | Rapport Enabled Sales | | |
|---|---|---|---|---|---|
| Step | Velocity | P(Success) | Step | Velocity | P(Success) |
| Pre Call Prep | 1 hour | 0.5 | Pre Call Prep | Instant | 1 |
| Build Rapport | 10 Mins | 0.4 | Build Rapport | 5 Mins | 0.8 |
| Needs Analysis | 10 Mins | 0.6 | Needs Analysis | Instant | 0.9 |
| Solution | 10 Mins | 0.3 | Solution | 5 Mins | 0.7 |
| Resolve Objections | 10 Mins | 0.4 | Resolve Objections | 10 Mins | 0.4 |
| TOTAL | 1 Hour 40 Mins | 1.44% | TOTAL | 20 Mins | 20.16% |

The technical architecture of the present invention is modular and highly scalable and incorporates best practice data governance and security. The solution is hosted on the Microsoft Azure Cloud. The invention's architecture is divided into three core modules:

Core Module 1: Data Housing

The Data Housing module is responsible for ingesting data, appending data, and transforming it into a structure that is suitable to be fed to the Data Science Layer. The module supports various transfer protocols (API (Application Programming Interface), SFTP (Secure File Transfer Protocol), manual upload etc.) depending on the capabilities and preferences of the user or client, respectively. By means of the Data Housing module processing structure, the data are fully normalized, enriched, indexed, and persisted into a set of task specific databases.

Core Module 2: Data Science Layer

The Data Science Layer generates the offers and complementary information. It also governs and/or controls and/or steers the lead bidding functionality and controls the flow of leads to the system's digital sales and/or market platform.

Core Module 3: Digital Sales and/or Market Platform

The Rapport Sales Platform is realized with an interactive graphical interface e.g. usable by sales agents. It can be built by using React and Django or the like.

The inventive system can e.g. be implemented by three implementation models to clients; (i) an end-to-end implementation, (ii) a lead only implementation, and (iii) a hybrid implementation. In general, the difference between the implementations is the degree to which the inventive system manages sales execution. (see FIG. 8)

(i) End-to-End Implementation: The present invention manages the entire lifecycle of the campaign and its data processing. Leads can be passed to an in-house call center agents who are experienced using the inventive system. Agents can e.g. be licensed to the carrier client so outbound calls are made from a brand the customer knows and trusts. The present invention can e.g. earn a commission on each sale. The commission rate can e.g. set to be within the distribution allowance.

(ii) Lead Only Implementation: The users or clients can e.g. get the full benefit of the inventive system lead generating capabilities while retaining responsibility for sales execution. When opportunities are generated by the inventive system, the leads can be sent to the user's or client's agents for sales execution. Leads are sent in a format that can be ingested by any CRM tool or any other suitable data storage technology. A style sheet can be provided such that the lead can be presented to agents in a format that is similar to the system's digital market or sales platform. This gives the carrier's agents some of the benefits of the guided sales process although the interactive components of the system's digital market or sales platform are not included. The present inventive system can e.g. automatically charge a fee for each lead transferred to the carrier's agents.

(iii) Hybrid Implementation: Agents of the carrier are provided a login to the system's digital market or sales platform and gain access to all of the platform features. Users or clients can get the full benefit of all inventive system's functionality but retain the responsibility for sales execution. The inventive system can e.g. set a commission on each sale and a software licensing fee can e.g. be charged on a 'per-seat' basis for access to the digital market or sales platform.

Figure 10:
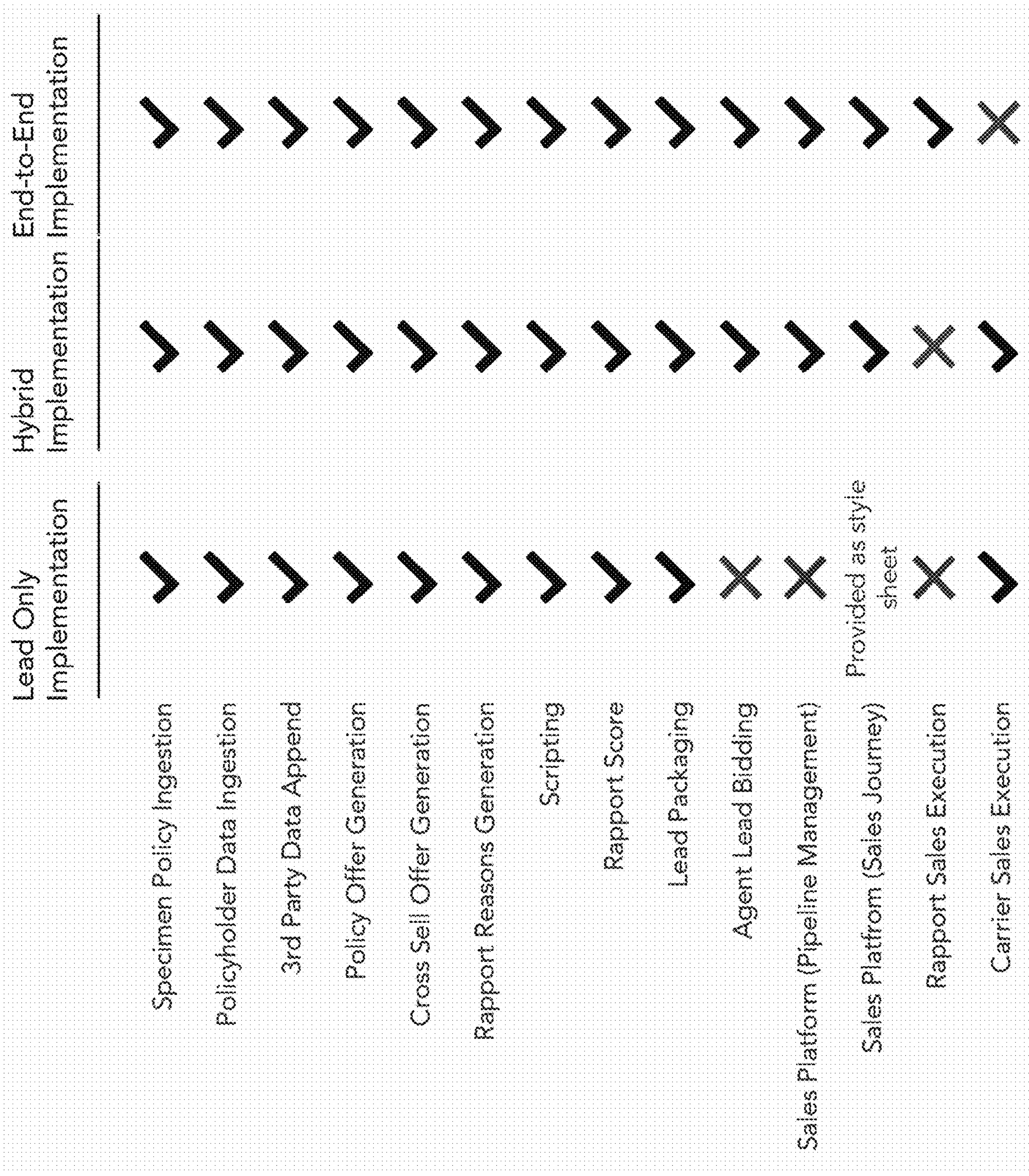
FIG. 10 shows a diagram, schematically illustrating the inventive system's features included in each implementation model.
Figure 12:
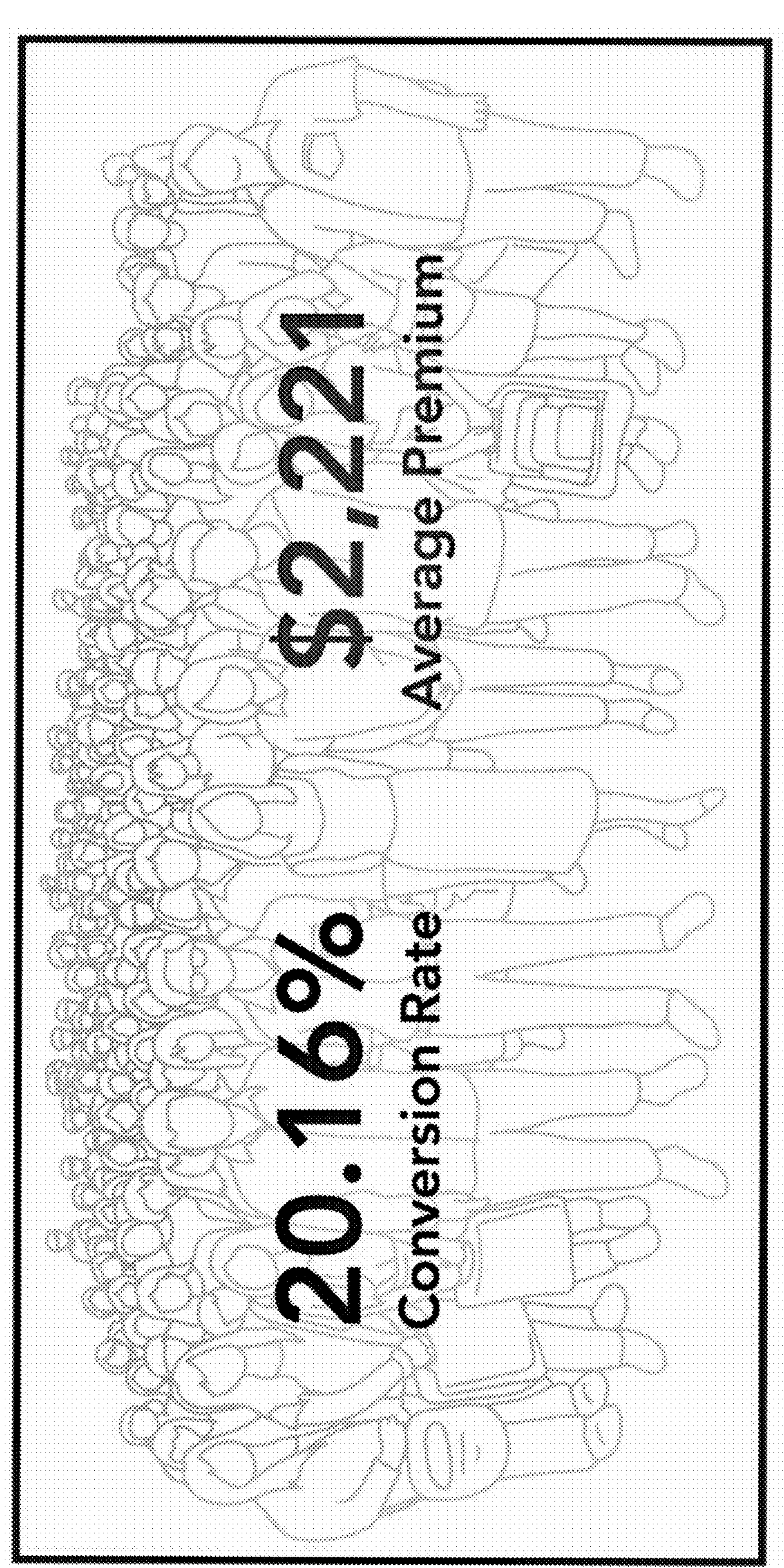
FIG. 12 shows a diagram, schematically illustrating a first application of the present invention making the advantages provided by the digital system obvious in terms of a conversion rate measure. Having deployed the inventive system in a marketing campaign to 4,800 existing customers, the campaign achieved a 20.16% conversion rate with an average sale of $2,221.
Figure 14:
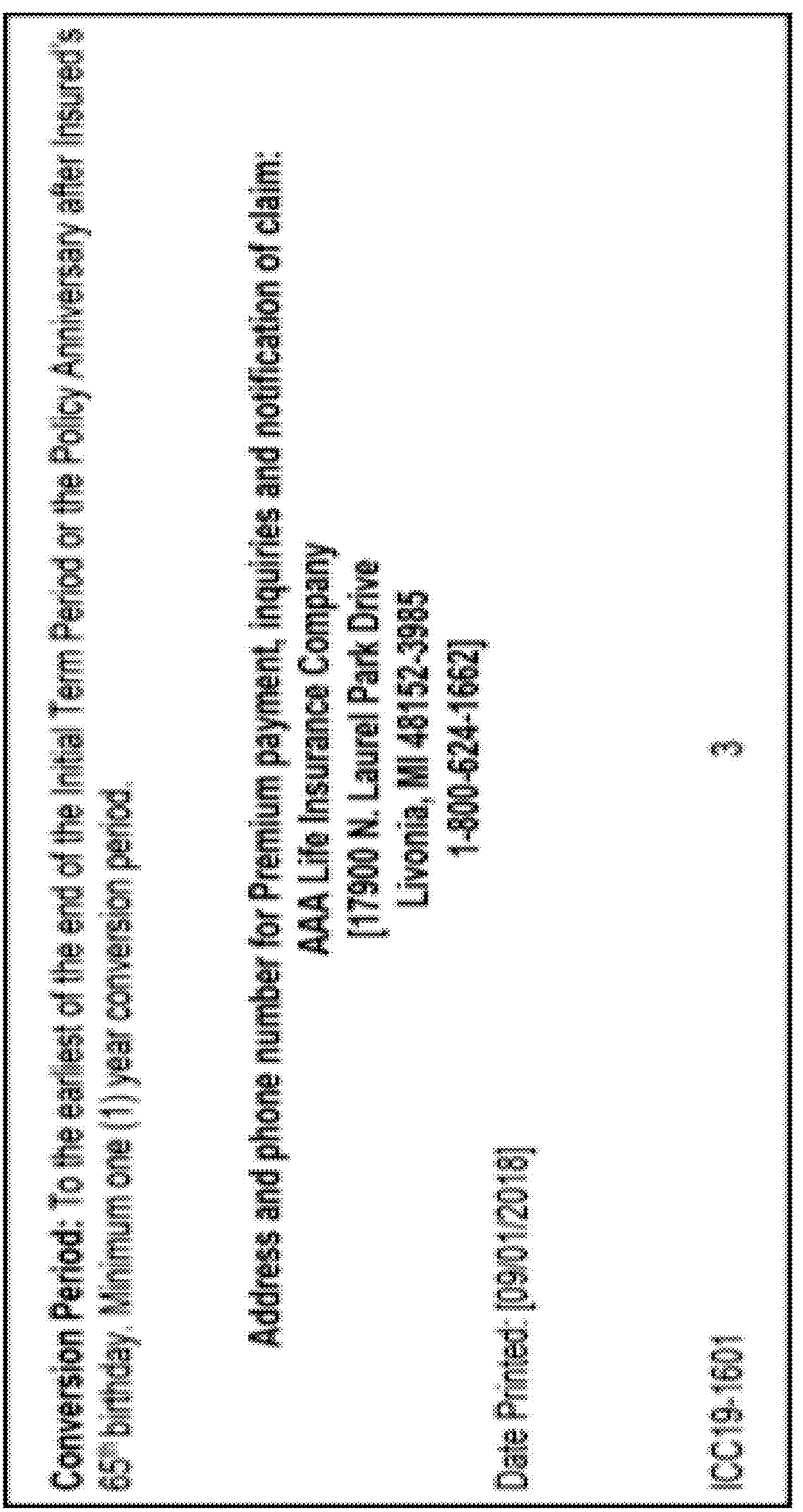
FIG. 14 shows a screenshot of an exemplary pdf file specimen contract at the point in the contract where the language related to the product conversion offer is located. For this example contract, this is the language the CIP must identify and translate into actions.

Customers' needs are ever changing and this insight is embedded in the present digital system's design. The inventive system can e.g. be continually monitoring the customer data, identifying opportunity as it arises. The data processing structures and algorithms in the data science layer can be executed on a daily basis generating new offers, updating rapport reasons and reengineering, or continuously adjusting time triggers. This means that for a sizable block of existing customers new opportunities can be generated e.g. daily for months or even years. An engagement with the inventive system thus has the advantage of a continuous flow of opportunity and revenue. FIG. 10 illustrates the inventive system's features included in each implementation model.

A first engaging with the present system can e.g. be realized by starting with identifying a target block of existing customers. A suite of products (risk-cover structures) can e.g. be compiled from which the present system derives the offers it generates. Products are assumed to be those produced by the client, however, if there is a gap in the client product portfolio there is the potential to white label third party products. Further, an opportunity assessment can e.g. be conducted to identify and quantify the amount of sales potential in the target block.

In order to conduct the opportunity assessment a number of inputs are required from the client: (a) Specimen contracts: Specimen contracts are ingested by Rapport and transformed into the policy logic that feeds the Data Science Layer; (b) Table layouts/data dictionary: Table layouts or data dictionaries that demonstrate the structure of policyholder data held by the carrier and/or TPA. The inventive system generates a "data extract specification" that outlines a baseline set of data that are required to perform the opportunity assessment; (c) Data extract: A one-time extract of policyholder data that conforms to the data extract specification. Data can be anonymized if desired; (d) Underwriting class tables: Underwriting class tables can e.g. be used to refine the offers generated by the inventive system; and (e) Cash value tables (if necessary): Cash value tables can e.g. be used to refine the offers generated by inventive system.

The present system can e.g. support a number of secure methods for ingesting these inputs. The system can evaluate the opportunity assessment inputs and create a set of analyses that give an indication of how many target customers are eligible for the offers that it generates. Premium potential is also demonstrated. The analyses can e.g. be presented by the system based on the principal of continuous engagement. Targets and premium potential can e.g. be shown in the time periods indicated by the time triggers created by the offer engine.

The Contract Intelligence Pipeline (CIP)

One of the core technical means of the present invention is the data processing stream denoted herein as Contract Intelligence Pipeline (CIP). Every life insurance contract contains legal clauses that delineate offers that can be made to customers. Examples include product conversions, face amount increases, and rider expirations. Each offer can be made to a particular customer if they meet the eligibility and related conditions, as set out in the relevant contractual language. The Contract Intelligence Pipeline automatically reads a digital or digitalized life risk-transfer (insurance) contract owned by a customer, and translates the contractual language into actionable offers for that customer. It does this by establishing their individual ability to meet the eligibility conditions for any given offer. In practice, this is done at scale over entire blocks of in-force customers. The CIP is a highly customized, chained series of machine learning modelling structures. Each model is independent but passes output down the chain of models, hence the overall system is a "pipeline" (or workflow). The CIP can e.g. be embedded as a core feature of the data science layer. For a given block of customers, the inputs to the CIP can e.g. be digital pdf files of all of the specimen risk-transfer contracts owned by customers in the block, together with a customer level dataset of standard fields held by the carrier client.

The output is a dataset that identifies the customers eligible for the various available offers, along with relevant data points for each offer, such as the date at which the offer expires. This output dataset is fed to downstream functionality within the inventive system to show agents which customers are eligible for which offers. Additionally, the system provides decision support such as time-triggers to notify agents of the optimal date to reach out to a given customer. In the following, a technical overview of the CIP methodology and results for term life contracts is provided. It is to be noted that the CIP is just one component of the data science layer. Other important components of the data science layer include enhancing the output of the CIP with modelling structures built on interaction data and third party data. In turn the data science layer is one of the modules of the inventive system and platform.

In general, the Contract Intelligence Pipeline captures and provides a four-step process: (1) Step 1: Parse a specimen term life contract digital file (e.g. pdf) into a dataset that describes the location, size, font type and related attributes of every character in the document; (2) Step 2: Recover the structure of the document (using the output of step 1) to group words into coherent units of text such as section headings, paragraphs, tables and other document artefacts; (3) Identify the document artefacts which contain language elements defining eligibility and other conditions of offers that can be made to customers; and (4) Translate and map the language elements identified in step 3 to a set of actions (i.e. parameterized queries) that can be executed against a standardized database of customer data.

In practice, steps three and four are part of the same technical routine as will be explained in the detailed methodological review presented below. This initial instance of the CIP focuses on identifying product conversion offers in term life contracts. However, the CIP can be readily extended to include all possible offers to customers and ultimately a broad range of life insurance products (e.g. Whole Life/Universal Life).

For the present solution, it can be shown that the document parsing and structure recovery steps are highly effective. The machine learning modelling structures used by this stage of the CIP correctly recover the document structure with an accuracy measure in excess of 99%. The modelling structures that identify offer language and map it to actions show similarly impressive results: they process the four most numerous conditions relating to product conversion with an accuracy measure in excess of 99%. In summary, the CIP represents a major innovation in the technical risk-transfer technology field. No prior art system is able to provide any comparable technology. While some of the technical improvements achieved by the present inventive system are clear from the discussion above, a technical advantage is also that a methodology is provided that can be technically be extended to multiple different types of life risk-transfers and potential offer gaps of customers. Rather, the present invention has not even be limited to life risk-transfer, but can be generally by applied to any set of risk-transfers covering non-life risk-transfer policies (i.e. providing cover for casualty and property risk exposures) and/or life risk-transfer policies. The current instance of the CIP is successfully utilized in the execution, where its technical value and its technical advantages could be concretely demonstrated. In this context, it has to be recalled that the inventive system and platform allows risk-transfer providers to unlock the value of their existing customers. It does so by giving carriers the ability to engage with their customers on a one-to-one basis, at scale. The inventive system enabled marketing campaigns to existing customers have a conversion rate 14 times higher than campaigns still relying on traditional sales methods. Typically in the prior art, the insurance carriers suffer from a fundamental inability to talk to existing policyholders. The information needed to have an engaging service-oriented conversation with customers is locked away in complicated policy documents, unconnected data sets, and legacy systems. Marketing to existing policyholders is so hard that insurers neglect the ever-changing needs of their customers. This leaves on the table a massive opportunity to grow customer value through further product sales. The inventive system tackles the problem at the heart of the deadlock by automatically ingesting and automatically processing specimen policies, connecting internal policyholder data, and bringing in relevant third-party data. The sophisticated data science layer processes this data and creates actionable customer profiles with "just-in-time" product offers that are tailored to each individual. The inventive system goes further by allowing to provide these offers in a graphical digital market and sales platform usable by agents. The digital market and sales platform has at its core a guided digital sales process that maximizes conversion by showing agents exactly when and how to deliver each offer. Individualized scripting based on behavioral science makes the conversation fluid and customer focused. The result is a 14 factor increase in conversion.

The initial instance of the Contract Intelligence Pipeline is configured to process product conversion offers contained in digital files, as e.g. pdf files, of Term Life specimen risk-transfer (insurance) contracts. FIG. 13 is a screenshot of an exemplary pdf file specimen contract at the point in the contract where the language related to the product conversion offer is located. For this example contract, this is the language the CIP must identify and translate into actions.

For parsing digital (e.g. pdf) content, specimen contracts are stored in pdf format. By design, the pdf format only stores character-level information needed to display the document, such as a character's location on page, font type and size, etc. For example, using pdfplumber, the entire contract can be parsed into the individual characters together with their bounding box and font information, as is displayed in the table below:

| Page | Line | Word | Text | Font | Left | Right | Top | Bottom |
|---|---|---|---|---|---|---|---|---|
| 2 | 25 | 165 | Conversion | NNGKCJ + Arial-BoldMT | 54.00 | 592.45 | 108.99 | 602.47 |
| 2 | 25 | 166 | Period: | NNGKCJ + Arial-BoldMT | 111.77 | 592.45 | 146.28 | 602.47 |
| 2 | 25 | 167 | To | NNGKBI + ArialMT | 149.04 | 592.45 | 160.73 | 602.47 |
| 2 | 25 | 168 | the | NNGKBI + ArialMT | 163.49 | 592.45 | 177.40 | 602.47 |
| 2 | 25 | 169 | earliest | NNGKBI + ArialMT | 180.17 | 592.45 | 212.40 | 602.47 |
| 2 | 25 | 170 | of | NNGKBI + ArialMT | 215.17 | 592.45 | 223.52 | 602.47 |
| 2 | 25 | 171 | the | NNGKBI + ArialMT | 226.28 | 592.45 | 240.19 | 602.47 |
| 2 | 25 | 172 | end | NNGKBI + ArialMT | 242.96 | 592.45 | 259.66 | 602.47 |
| 2 | 25 | 173 | of | NNGKBI + ArialMT | 262.42 | 592.45 | 270.77 | 602.47 |
| 2 | 25 | 174 | the | NNGKBI + ArialMT | 273.54 | 592.45 | 287.45 | 602.47 |
| 2 | 25 | 175 | Initial | NNGKBI + ArialMT | 290.14 | 592.45 | 313.50 | 602.47 |
| 2 | 25 | 176 | Term | NNGKBI + ArialMT | 316.27 | 592.45 | 339.62 | 602.47 |
| 2 | 25 | 177 | Period | NNGKBI + ArialMT | 342.39 | 592.45 | 371.31 | 602.47 |
| 2 | 25 | 178 | or | NNGKBI + ArialMT | 374.08 | 592.45 | 382.98 | 602.47 |
| 2 | 25 | 179 | the | NNGKBI + ArialMT | 385.75 | 592.45 | 399.66 | 602.47 |
| 2 | 25 | 180 | Policy | NNGKBI + ArialMT | 402.43 | 592.45 | 429.18 | 602.47 |
| 2 | 25 | 181 | Anniversary | NNGKBI + ArialMT | 431.96 | 592.45 | 484.83 | 602.47 |
| 2 | 25 | 182 | after | NNGKBI + ArialMT | 487.61 | 592.45 | 507.64 | 602.47 |
| 2 | 25 | 183 | Insured's | NNGKBI + ArialMT | 510.42 | 592.45 | 550.94 | 602.47 |
| 2 | 26 | 184 | 65th | NNGKBI + ArialMT | 54.00 | 603.23 | 70.56 | 613.93 |
| 2 | 26 | 185 | birthday. | NNGKBI + ArialMT | 72.36 | 603.91 | 110.75 | 613.93 |

Using these data, nearby, homogeneous sets of characters can e.g. be grouped into words, and words into lines of text with near-perfect accuracy.

The results of the digital file (e.g. PDF) parsing are fed to a routine that recovers the structure of the document from the individual words to identify document sections, heading, paragraphs and sentences. Doing so is critical for the language processing tasks that make up the final step of the CIP.

This document structure recovery routine chains together several customized technologies as described in the following.

Figure 15:
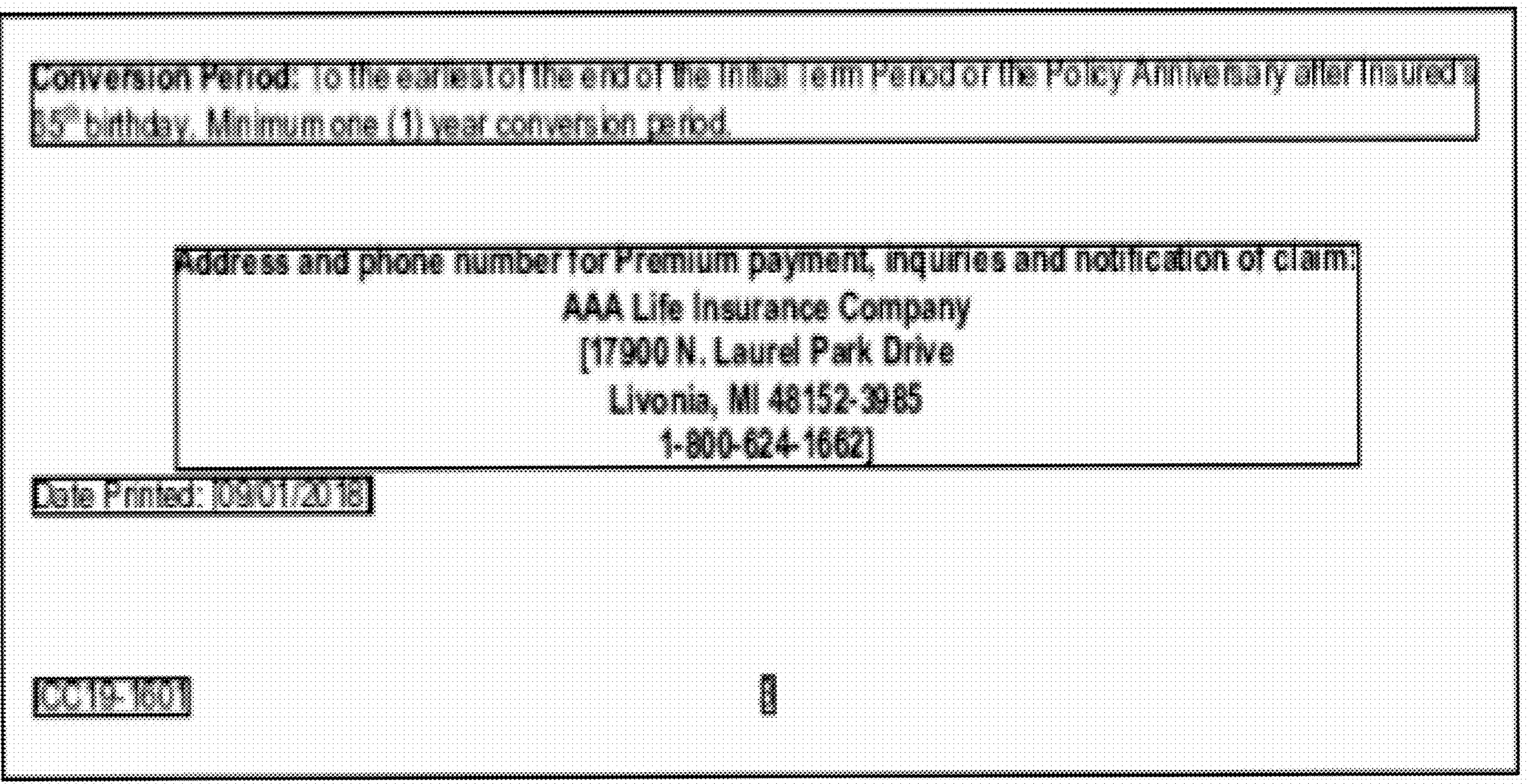
FIG. 15 illustrates a screenshot of the output of the first process, where nearby words are clustered based on text density using a custom distance matrix that takes location and font characteristics into account. With suitably tuned parameters, this technique generates text blocks that match section headings and paragraphs with very high accuracy, including for more complex cases such as two-column layouts.

First, nearby words are clustered based on text density using a custom distance matrix that takes location and font characteristics into account. With suitably tuned parameters, this technique generates text blocks that match section headings and paragraphs with very high accuracy, including for more complex cases such as two-column layouts. FIG. 15 illustrates the output of this process.

In the next step, it is determined whether each text block is a section heading, text paragraph, table, or some other type of document artefact. This is done by building a machine learning model with a custom architecture that integrates a deep, pre-trained neural language model with additional hand-engineered features designed to capture typical document artefact characteristics. To generate data suitable for training the model, document artefacts are labeled in several hundred specimen contracts according to their layout role.

Lastly, to isolate "sentence" artefacts, another pre-trained language model segments the paragraph text identified above into individual sentences. These sentences will be the input for the decision logic model structure that is developed in the next step.

The final pipeline step identifies sentence artefacts that contain language defining the eligibility and other conditions for an offer that can be made to a customer. The model structure then maps these language elements to actions (python functions) that can be used as database filters. The conditions may require parameters (such as an age threshold, date range, or the number of years a policy has been in force) to be passed to the target functions to which they are mapped. Downstream, these functions are applied to the standardized customer data to identify which customers are eligible for which offer at any given point in time.

To enable the use of a supervised learning methodology, we annotated and labeled a sample of more than 800 specimen contracts to identify the document artefacts that contain the offer conditions language and any relevant parameters that need to be passed to the resulting function. The technical backbone for this part is a pre-trained language model structure that is first adapted to the Term Life risk-transfer (insurance) domain and then fine-tune so that it learns to decide whether a text segment establishes a certain condition, and to identify relevant parameters as needed.

Figure 16:
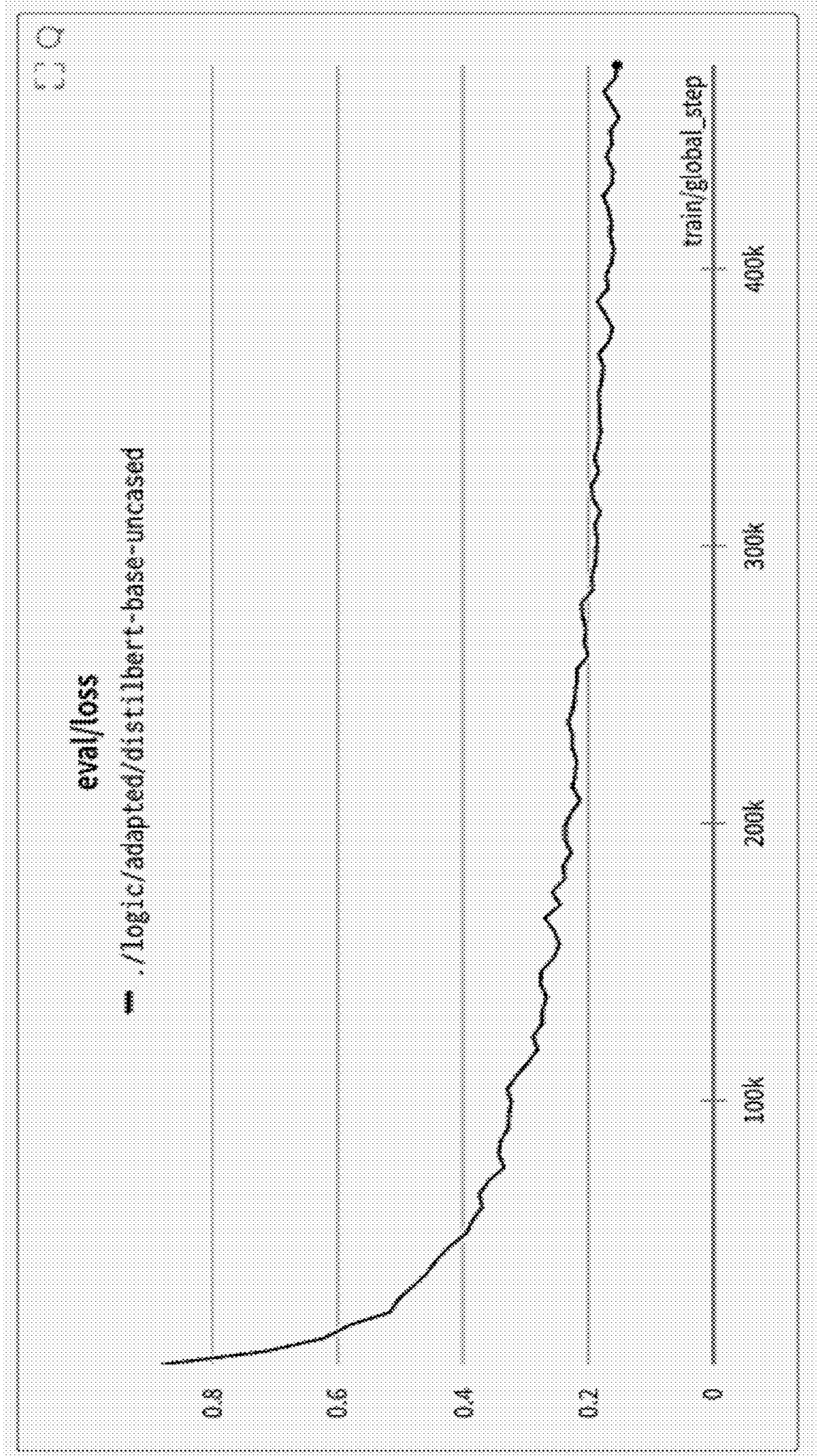
FIG. 16 shows a diagram, schematically illustrating how domain adaptation substantially improved the language model performance over an exemplary 14 h training run.

More specifically, a modelling structure (e.g. distilbert) is adapted by continuing the original language model training with suitable optimization parameters on a sample of several hundred specimen contracts. FIG. 16 shows how domain adaptation substantially improved the language model performance over an exemplary 14 h training run.

For the domain adaptation, it has to be noted the following: A language model learns to predict missing words in a sentence or a paragraph. The learning process is valuable because, as a byproduct, it teaches the model to represent words in numerical form based on their usage in context. Such a representation is vital for a machine to make sense of a sequence of words and draw conclusions. State-of-the-art language models can reach or even exceed human-level performance on sentiment detection or text classification tasks. However, they can have hundreds of millions or even billions of parameters, requiring several weeks to train from scratch, using hundreds of specialized computers and billions of documents. Such an initial investment would be prohibitive except for very large-scale applications (like Google search). Fortunately in the present case, these models are suitable for domain adaptation: language understanding learned from generic inputs carries over to numerous specialized tasks with much more cost-effective ‘fine-tuning’ efforts. These efforts include (1) adapting the model to domain-specific language and (2) modifying only the final layers of the network to make them suitable for classifying text segments rather than predicting missing words.

Figure 17:
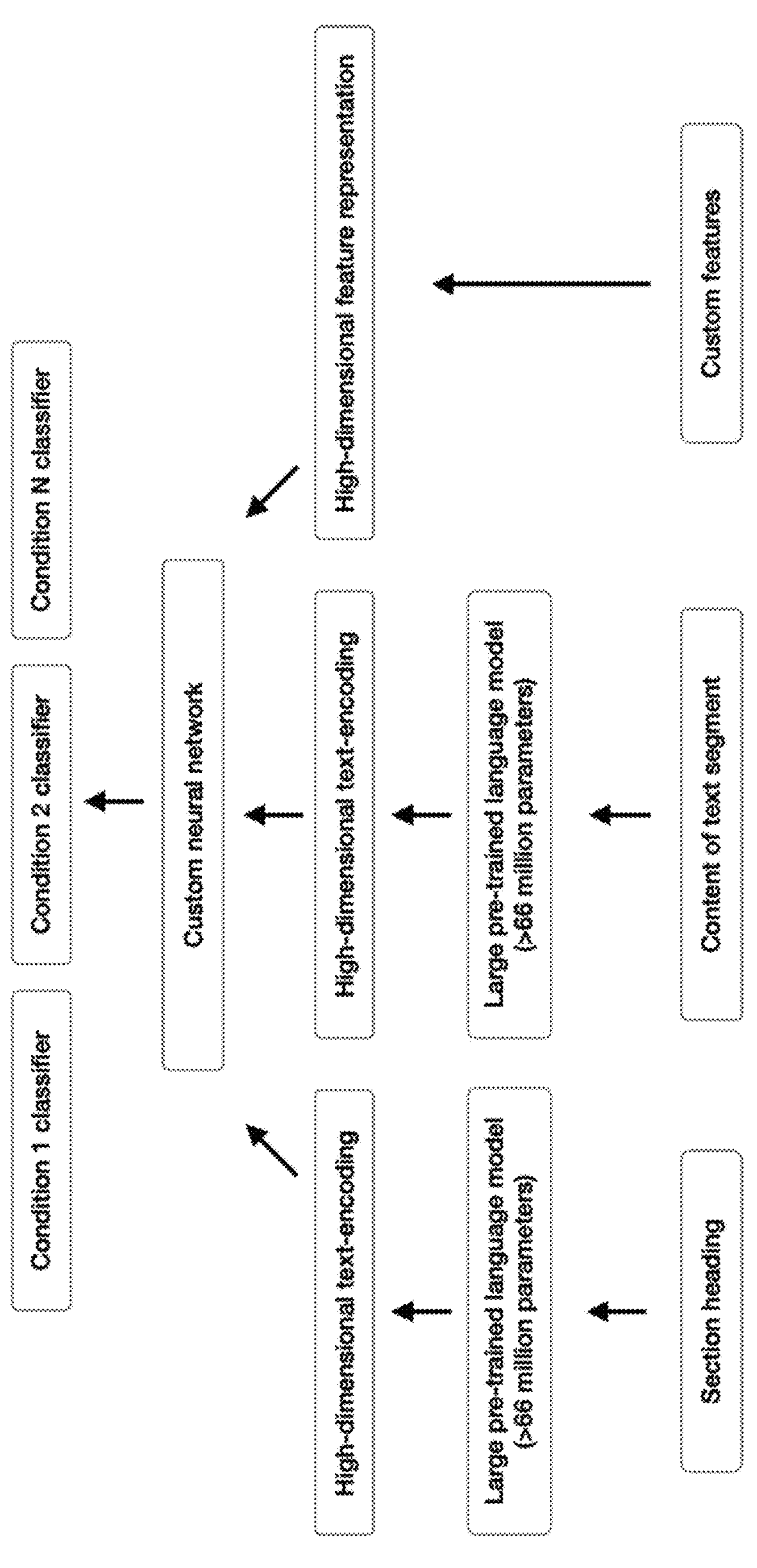
FIG. 17 shows a diagram, schematically illustrating the creation of another custom deep learning model to incorporate additional information extracted by the prior pipeline components.
Figure 18:
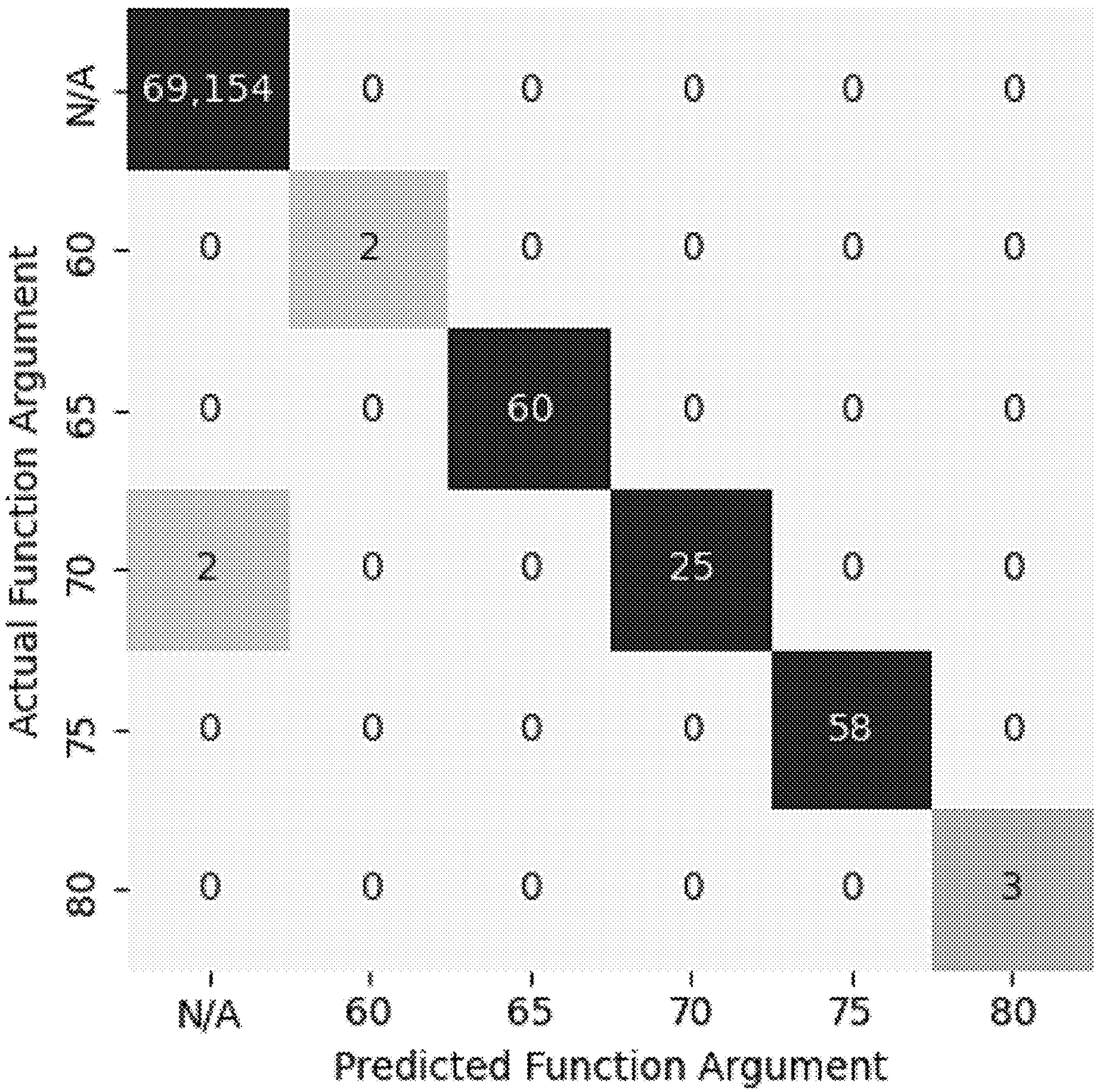
FIG. 18 shows a diagram, schematically illustrating one of the four most numerous eligibility conditions across the sample together with the confusion matrix that demonstrate the results of the pipeline at the condition level. This condition can be described having the customer eligible for product conversion offer before the date of the policy anniversary in the year when the customer is N years old. In this instance N must be passed as an argument to the target function.
Figure 19:
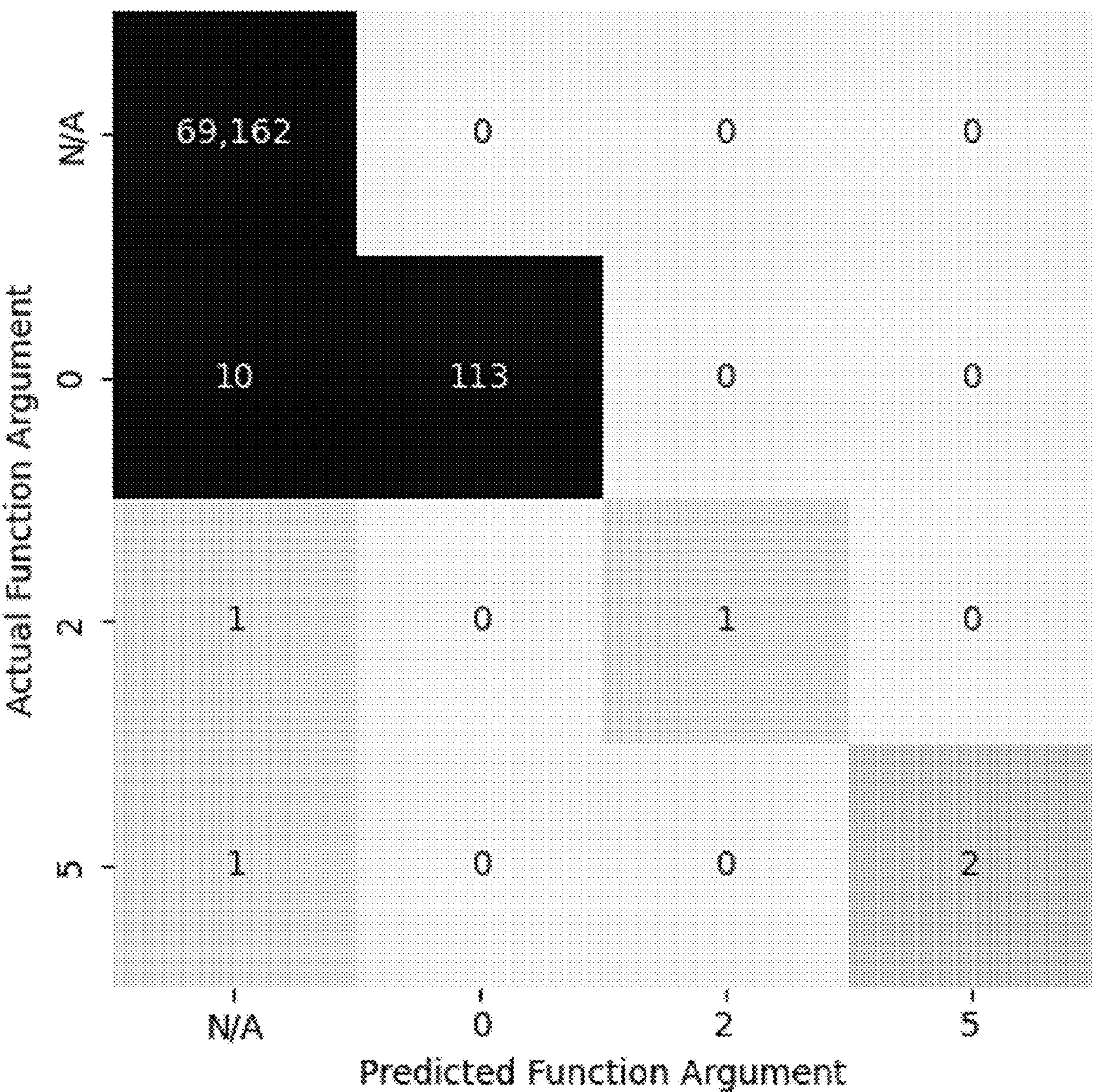
FIG. 19 shows a diagram, schematically illustrating one of the four most numerous eligibility conditions across the sample together with the confusion matrix that demonstrate the results of the pipeline at the condition level. This condition can be described having the customer eligible for product conversion offer before the date of the end of the original term minus N years. In this instance N must be passed as an argument to the target function.
Figure 20:
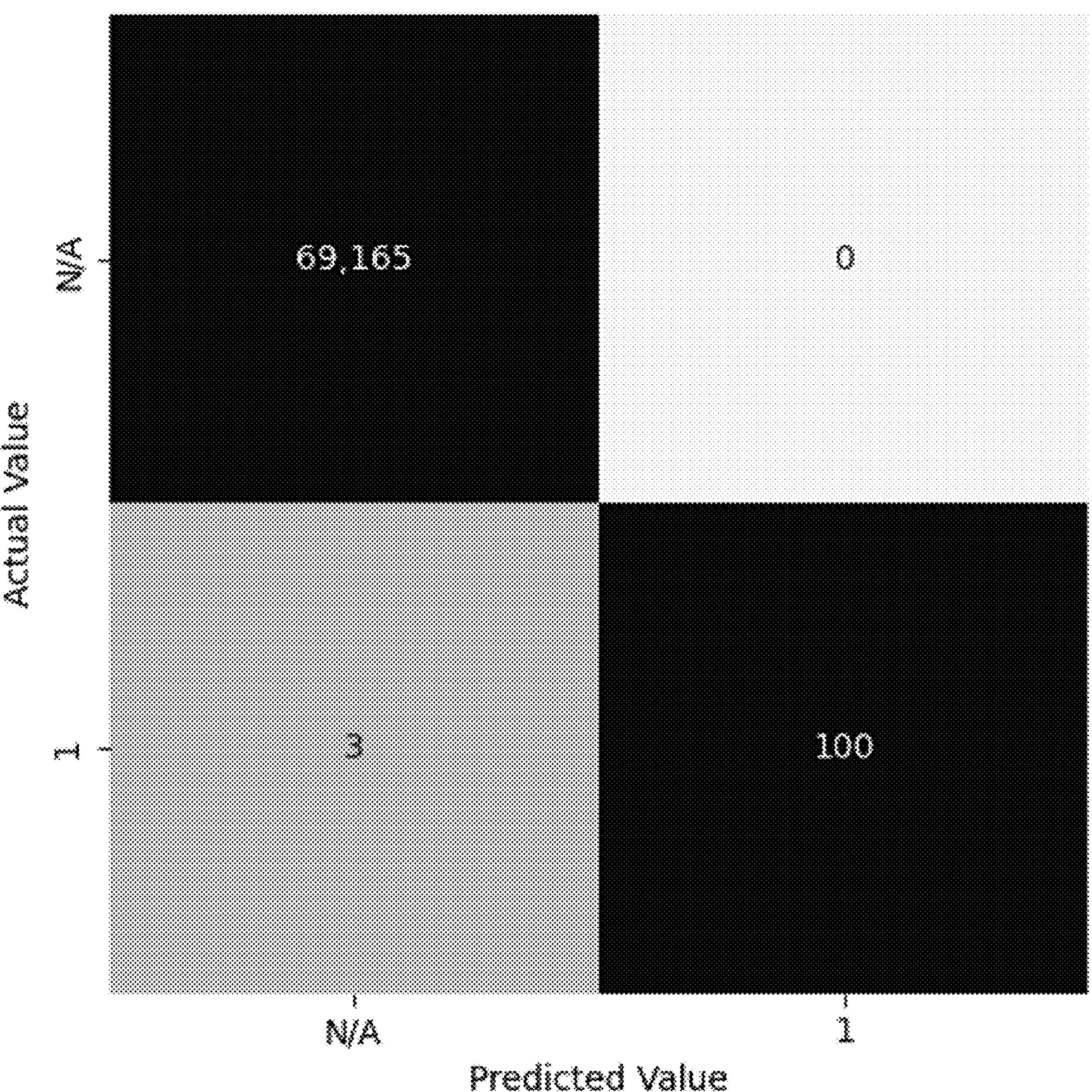
FIG. 20 shows a diagram, schematically illustrating one of the four most numerous eligibility conditions across the sample together with the confusion matrix that demonstrate the results of the pipeline at the condition level. This condition can be described having the customer eligible for product conversion offer provided the contract is in-force. In this instance no arguments are passed to the target function.
Figure 21:
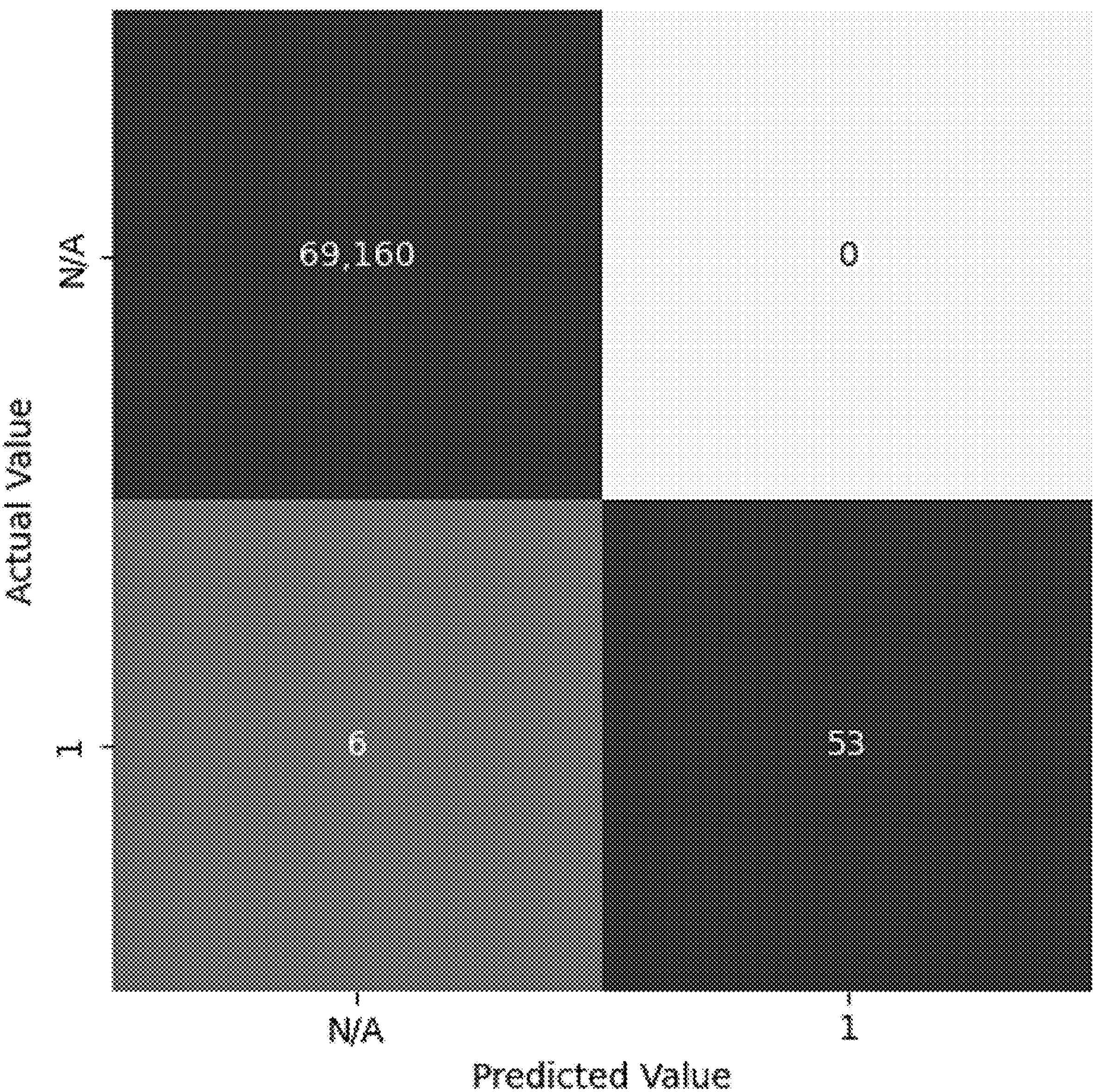
FIG. 21 shows a diagram, schematically illustrating one of the four most numerous eligibility conditions across the sample together with the confusion matrix that demonstrate the results of the pipeline at the condition level. This condition can be described having the customer eligible for product conversion offer provided the contract is currently premium paying. In this instance no arguments are passed to the target function.
Figure 22:
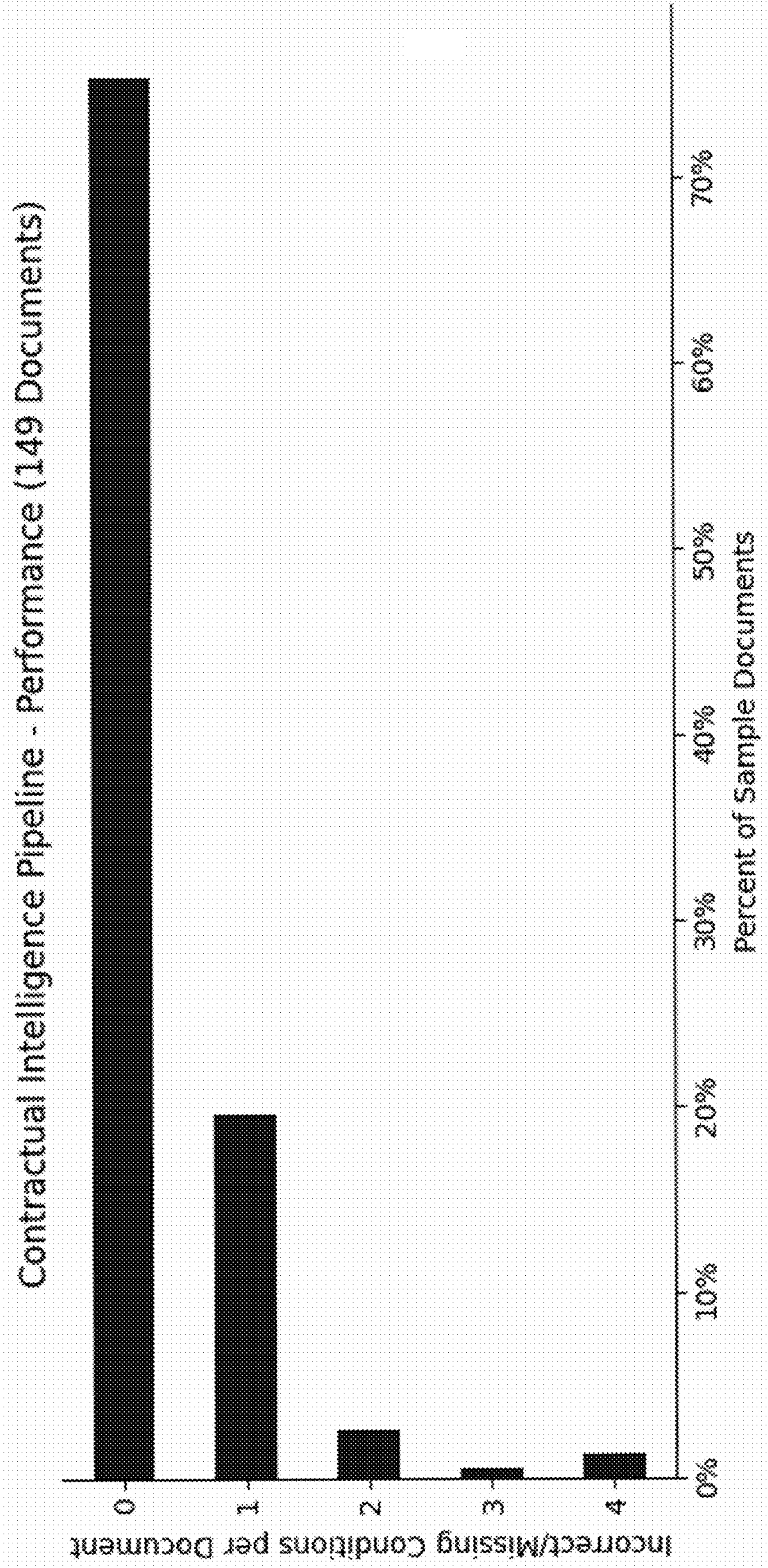
FIG. 22 shows a diagram, schematically illustrating that it matters whether the modelling structure can correctly classify every condition relating to the product conversion offer in any given digital or digitalized specimen contract. For a total of 111 out of the 149 sample documents (74.5%), the pipeline correctly identified all relevant conditions. Fora further 29 (19.5%), it misses one condition, and for nine (6%) it makes two or more mistakes. In most cases, these errors arise with conditions that occur five or fewer times in the sample. (see FIG. 22)
Figure 23:
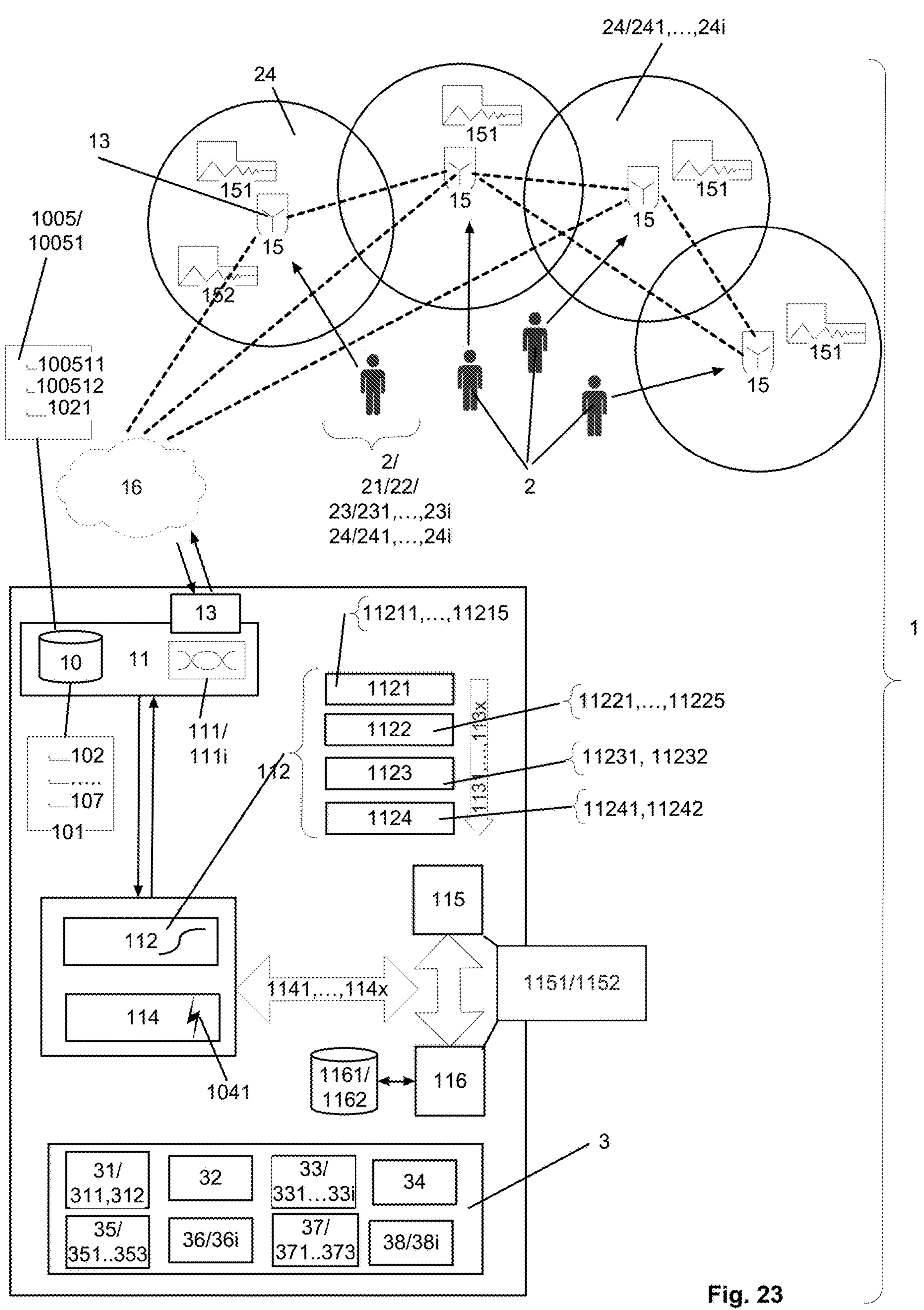
FIG. 23 shows a diagram, schematically illustrating an embodiment of the inventive parameter pattern-driven, digital, data mining system 1 with a knowledge extraction engine 11 based on a customizable chain of machine-learning-structures 112 providing an automated pipeline for data processing 111 of complex data structures 113/1131, . . . , 131*x* with a hidden pattern detection 114 for triggering automated under-writing processes 12, in that a plurality of digital risk-transfer policies 101/1011, . . . , 101*x* are assessed via a data interface 13 and storable captured by a persistence repository unit 10 of the parameter pattern-driven, data mining system 1, wherein a digital risk-transfer policy 101/1011, . . . , 101*x* at least comprises premium parameter values 102 and/or deducible parameter values 103 and/or risk-transfer type definition parameter values 104 and/or policy limits parameter values 105 and/or exclusion parameter values 106 and/or riders/addit parameter values 107, in that the parameter pattern-driven, data mining system 1 comprises a chained series of machine learning modeling structures 112 automatically assessing and parsing digital risk-transfer policies 101/1011, . . . , 101*x* of a policyholder, and automatically translating contractual language of the digital risk-transfer policy 101/1011, . . . , 101*x* into actionable digital offers 141 as output signaling 14 for the policyholder by generating appropriate new digital risk-transfer policies 142 for the automated under-writing processes 12 triggered by the system 1.
Figure 24:
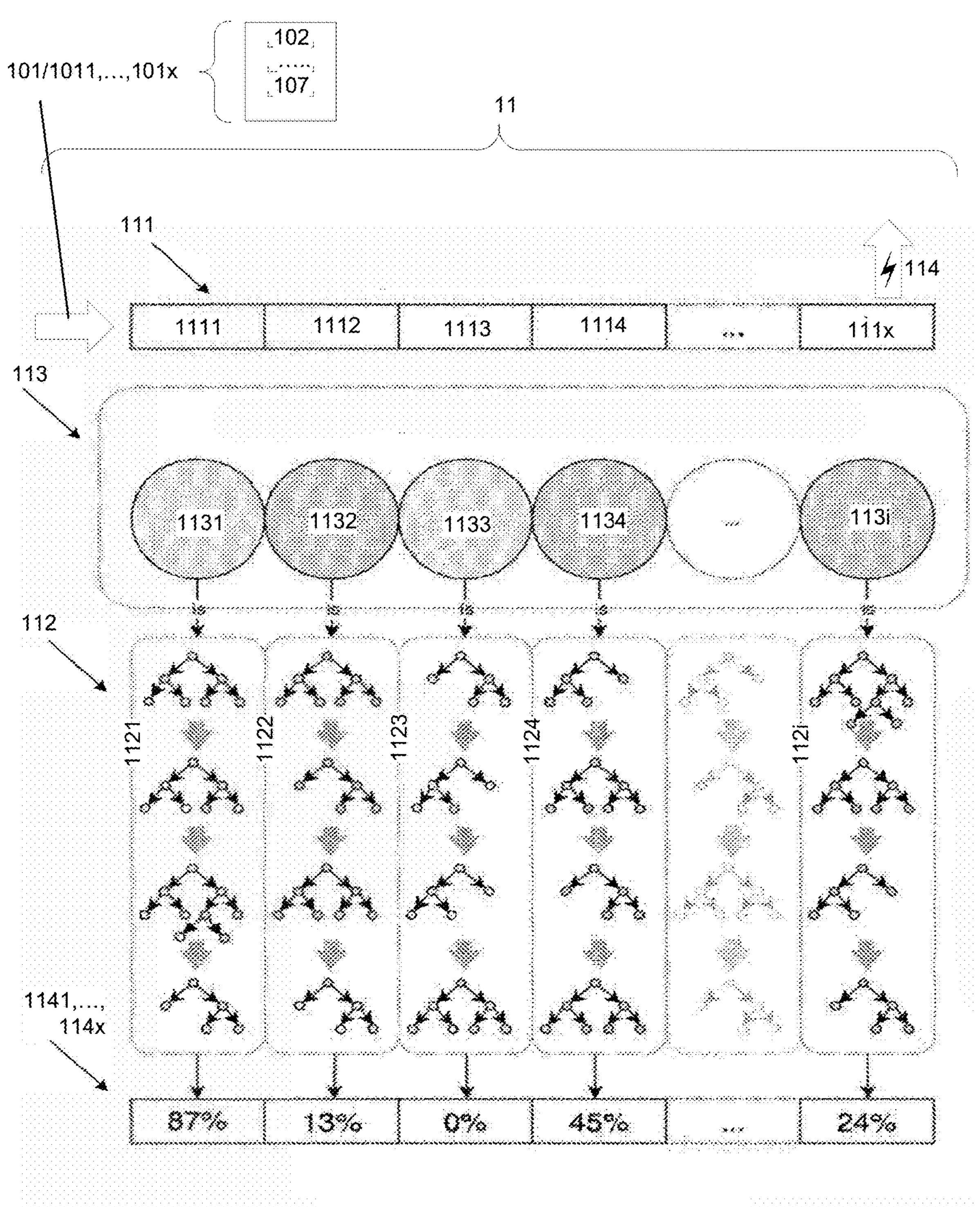
FIG. 24 shows a diagram, schematically illustrating an embodiment variant of the inventive knowledge extraction engine 11 based on a customizable chain of machine-learning-structures 112 providing an automated pipeline for data processing 111 of complex data structures 113/1131, . . . , 131*x* with a hidden pattern detection 114 for triggering automated under-writing processes 12, in that a plurality of digital risk-transfer policies 101/1011, . . . , 101*x* are assessed via a data interface 13 and storable captured by a persistence repository unit 10 of the parameter pattern-driven, data mining system 1, wherein a digital risk-transfer policy 101/1011, . . . , 101*x* at least comprises premium parameter values 102 and/or deducible parameter values 103 and/or risk-transfer type definition parameter values 104 and/or policy limits parameter values 105 and/or exclusion parameter values 106 and/or riders/addit parameter values 107, in that the parameter pattern-driven, data mining system 1 comprises a chained series of machine learning modeling structures 112 automatically assessing and parsing digital risk-transfer policies 101/1011, . . . , 101*x* of a policyholder, and automatically translating contractual language of the digital risk-transfer policy 101/1011, . . . , 101*x* into actionable digital offers 141 as output signaling 14 for the policyholder by generating appropriate new digital risk-transfer policies 142 for the automated under-writing processes 12 triggered by the system 1.
Figure 25:
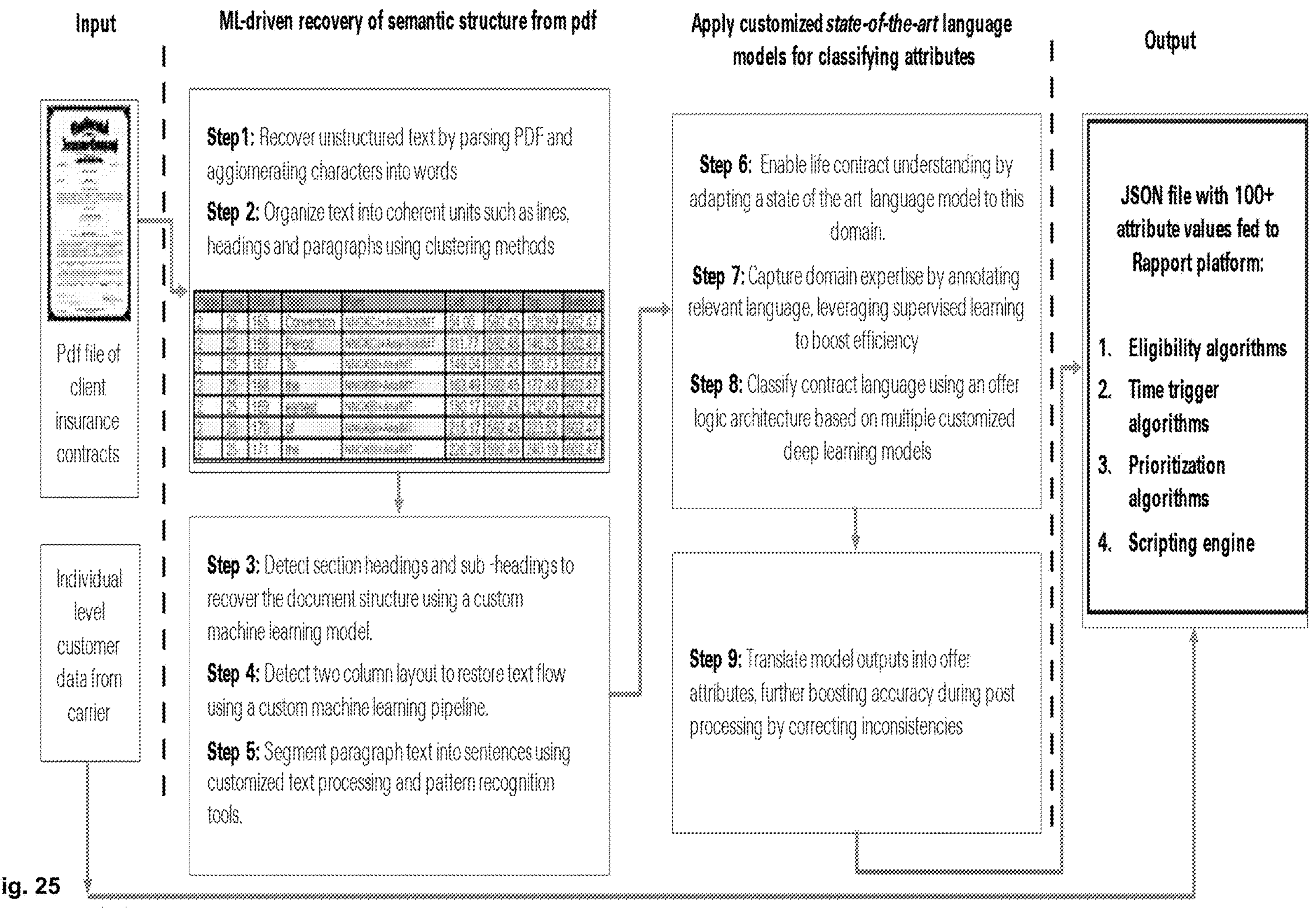
FIG. 25 shows a diagram, schematically illustrating the inventive system's 1 and the inventive knowledge extraction engine's 11 data processing and data ingestion providing the technical means and structure for breaking the deadlock of unconnected data sets. The life insurance contract indicated in FIG. 25 is the same as the life insurance contract shown in FIG. 13.

After updating the model’s parameters to better capture the domain-specific language, the model’s final layers can e.g. be replaced to convert the language model functionality into a classifier that maps input sentences to target functions together with any requisite arguments (parameters). To incorporate additional information extracted by the prior pipeline components, another custom deep learning model can be created as shown in FIG. 17. The model leverages the adapted language model while integrating the pertinent section heading artefacts and additional features, similar to the approach to identify the layout discussed above.

The final pipeline step also involves post-processing the model predictions. Fortunately, the models make only relatively few mistakes, and the vast majority of them are near-misses (such as predicting a more common parameter for the correct function) that can be automatically corrected using simple checks and adjustments. As a result, the final pipeline output is rarely wrong, while missing only a very small number of relevant conditions.

As discussed above, the processing of the digital files (as e.g. pdf files) into document artefacts steps of the pipeline are highly effective, with accuracy measures in excess of 99%. The results presented below report on the final stage of the pipeline i.e. the identification of offer-relevant language in contract sentences, and the subsequent classification of that language as a function with relevant parameters. A sample of exemplary 149 specimen contracts was used. The specimen contracts were extensively annotated in order to allow for the supervised learning methodology described above. The methodology for annotating specimen contracts can be itself a valuable output because it allows to understand how to execute this foundational part of the process most efficiently. This makes the CIP technically extensible to other offers and life risk-transfer contract types. An exhaustive set of conditions for the product conversion offer was derived from the annotated sample. Across the entire sample, 14 unique conditions were identified. The sample size for each condition and its arguments varies; some are relatively unique in the sample, others are more numerous. Each specimen contract contains multiple conditions that relate to the product conversion offer. In order to correctly identify customers that are eligible for the offer (and to correctly generate the relevant data points that delineate the parameters of the offer), the pipeline needs to correctly identify all of the conditions in any given contract. The set of 14 conditions naturally require a set of 14 functions and their arguments (parameters) in order to perfectly represent them in the standardized customer database. The functions require arguments to varying degrees; some require no arguments, and others require up to eight arguments. To make efficient use of a small sample size no test sample was held out. The reported results can e.g. be based on a 5 fold cross-validation methodology.

Despite the small exemplary sample size, the modelling structure performs very well at identifying sentences that contain offer-relevant language and classifying the language as a function with arguments. For the vast majority of the function/argument combinations, recall and precision values are in excess of 0.9. The four most numerous eligibility conditions (1-4) across the sample are described below together with the confusion matrices that demonstrate the results of the pipeline at the condition level (Note that any row/column values that are not “N/A” in the matrices mean the function must be called for the sentence in question. For conditions (1) and (2) the row/column values that are not “N/A” mean the function must be called together with the argument as represented by the row/column value):

Condition 1: Customer eligible for product conversion offer before the date of the policy anniversary in the year when the customer is N years old. In this instance N must be passed as an argument to the target function. (see FIG. 18)

Condition 2: Customer eligible for product conversion offer before the date of the end of the original term minus N years. In this instance N must be passed as an argument to the target function.

Condition 3: Customer eligible for product conversion offer provided the contract is in-force. In this instance no arguments are passed to the target function.

Condition 4: Customer eligible for product conversion offer provided the contract is currently premium paying. In this instance no arguments are passed to the target function.

The recall, precision and accuracy measures for each condition are presented in the table below:

| Short Name | Precision (Macro Avg) | Precision (Weighted Avg) | Recall (Macro Avg) | Recall (Weighted Avg) | Accuracy |
|---|---|---|---|---|---|
| Anniversary N | 1.00 | 1.00 | 0.99 | 1.00 | 0.99 |
| Term N | 1.00 | 1.00 | 0.77 | 1.00 | 0.99 |
| Inforce | 1.00 | 1.00 | 0.99 | 1.00 | 0.99 |
| Paying | 1.00 | 1.00 | 0.96 | 1.00 | 0.99 |

These results demonstrate that—even with a small sample—the pipeline is extremely effective at correctly identifying sentences containing offer conditions and classifying them into the correct function category. For those conditions that occur in the sample with very low frequency, the modelling structure can be naturally less effective. However, this technical problem disappears by increasing the sample size.

Ultimately, it matters whether the modelling structure can correctly classify every condition relating to the product conversion offer in any given digital or digitalized specimen contract. For a total of 111 out of the 149 sample documents (74.5%), the pipeline correctly identified all relevant conditions. Fora further 29 (19.5%), it misses one condition, and for nine (6%) it makes two or more mistakes. In most cases, these errors arise with conditions that occur five or fewer times in the sample. (see FIG. 22)

A larger sample, a larger language model and further enhancements to the model architecture and enhanced post-processing logic are highly likely to significantly boost performance from an already strong baseline. Additionally, it should be noted that building the language models in the CIP is computationally intensive. To date, the models were trained only on a locally available (single) GPU. Increasing the number of available GPUs available locally, or moving the CIP to a cloud-based infrastructure stack will mean that vastly more computational power can be added. By enabling larger-scale architectures and optimization efforts, this will further increase the effectiveness of the modelling structures.

Lastly, it is important to understand the nature and consequences of the document level errors. Most errors result from failing to identify infrequent condition modifiers (such as reducing the eligibility period by 31 days). Although it can be assumed that realizing the above options for further improvements will ultimately reduce errors to nearly zero, the errors such as they are would not cause any major problems in implementing Rapport. For the example mentioned, for instance, customers are generally contacted long before the end of the eligibility period. Overall, the document level results are extremely encouraging. With a small sample our model is able to correctly classify all the offer-related conditions language in specimen contracts in 75% of all contracts.

In summary, the inventive Contract Intelligence Pipeline (CPI) represents a major technical innovation in the technical risk-transfer technology filed. No other prior art system has any comparable technology nor any invention-like digital platform in the prior art within which such a pipeline could be embedded. The current instance of CIP was successfully utilized in executing the inventive digital system and platform for users. Its technical value and improvements have been concretely demonstrated above going beyond only improving accuracy of the system or processing efficiency and speed, however, including them.

LIST OF REFERENCE SIGNS

- 1 Parameter pattern-driven, digital, data mining system
  - 10 Data Store/Persistence repository unit
    - 101 Digital risk-transfer policies
      - 1011, . . . , 101$x$ Digital risk-transfer policy
    - 102 Premium parameter values
    - 103 Deducible parameter values
    - 104 Risk-transfer type definition parameter values
    - 105 Policy limits parameter values
    - 106 Exclusion parameter values
    - 107 Riders/addit parameter values
  - 11 Knowledge extraction engine
    - 111 Data processing pipeline
      - 1111, . . . , 111$x$ Processing steps
    - 112 Chain of machine-learning-structures
      - 1121 Parser structure
        - 11211 Parser Tree
        - 11212 Location
        - 11213 Size
        - 11214 Font type
        - 11215 Related attributes of a character
      - 1122 Recovering structure
        - 11221 Coherent units of words
        - 11222 Section headings
        - 11223 Paragraphs
        - 11224 Tables
        - 11225 Other document artefacts or characteristics
      - 1123 Identifier structure
        - 11231 Language elements providing measurement for Eligibility
        - 11232 Condition parameters
      - 1124 Linker structures
        - 11241 Parameterized queries
        - 11242 Standardized database of customer data
    - 113 Input feed
      - 1131, . . . , 113$x$ Input feed 1, . . . , x
    - 114 Trigger triggering pattern detection signal
      - 1141, . . . , 114$x$ Digital signal transfer
    - 115 Learner Component
      - 1151 Extractor process
      - 1152 Pattern learner structure
    - 116 Matcher
      - 1161 Training data
      - 1162 Labelling data
  - 12 Triggered automated under-writing processes
  - 13 Data transfer interface
  - 14 Output signaling
    - 141 Digital actionable offers
    - 142 Generated new digital risk-transfer policies
  - 15 Wearables/IoT Sensory (input devices and sensors)
    - 151 Bodily sensory devices
    - 152 Environmental sensory devices
  - 16 Data transmission network
- 2 Real-world Risk-exposed Individual
  - 21 Physical Body Structure
  - 22 Intangible Body Conditions (Psychological)
  - 23 Subsystems of the Real-world Individual
    - 231, 232, 233, . . . , 23$i$ Subsystems 1, . . . , i
  - 24 Environment/Ecosystem of Individual
    - 241, 242, 243, . . . , 24$i$ Subsystems 1, . . . , i
- 3 Digital Individual Measuring Engine
  - 31 Digital Intelligence Layer
    - 311 Machine Learning
    - 312 Neural Network
  - 32 Body Parameters of the Real-World Individual
  - 33 Status Parameters of Real-World Individual
    - 331 Physiological (Body) Status Parameters
    - 332 Psychological Status Parameters
    - 333 Habits/Behavioral Status Parameters (Nutrition/Sport etc.)
    - 333 Environmental Status Parameters (Living Condition etc.)
  - 34 Data Structures Representing States of Each of the Plurality of Subsystems of the Real-World Individual
  - 35 Digital Peril and/or Life-risk-event Robot
    - 351 Simulation 352 Synchronization
353 Twin Linking: Sensory/Measuring/Data Acquisition
36 Digital Ecosystem Replica Layer
361, 362, 363, . . . , 36*i* Virtual Subsystems of Virtual Representation of Ecosystem
37 Digital Object/Element of the Individual
371 Simulation
372 Synchronization
373 Linking: Sensory/Measuring/Data Acquisition
38 Digital Individual Replica Layer
381, 382, 383, . . . , 38*i* Virtual Subsystems of Real-World Individual

The invention claimed is:

1. A parameter pattern-driven, digital, data mining system, the system comprising:

a knowledge extraction engine having, a customizable chained series of machine learning modeling structures, wherein each machine learning modeling structure of the chained series of machine learning modeling structures passes an output to a next machine learning modeling structure of the chained series of machine learning modeling structures to provide an automated pipeline for data processing of complex data structures, and a hidden pattern detection unit configured to trigger automated under-writing processes;

a data interface configured to assess a plurality of digital risk-transfer policies; and a persistence repository unit configured to store the plurality of digital risk-transfer policies, wherein each of the plurality of digital risk-transfer policies at least includes premium parameter values, and wherein the chained series of machine learning modeling structures are configured to automatically assess and parse a digital risk-transfer policy of the plurality of digital risk-transfer policies, and automatically translate contractual language of the digital risk-transfer policy into a set of actions.

2. The system according to claim 1, wherein, for the assessing and the parsing, the chained series of machine learning modeling structures include one or more parser structures configured to select one of the plurality of digital risk-transfer policies of the persistence repository unit and parse assessable characters, words, and string of words of the selected one of the plurality of digital risk-transfer policies into digital constituents by providing and storing a parse tree that at least includes location attributes of every character in the selected one of the plurality of digital risk-transfer policies.

3. The system according to claim 2, further comprising a learner component configured to provide an open extractor process with a self-supervised learning of semantic relations during processing of the plurality of digital risk-transfer policies stored in the persistence repository unit.

4. The system according to claim 3, wherein the learner component comprises a pattern learner configured to classify whether a shortest dependency path between two strings of words or pattern of words indicate a semantic relation.

5. The system according to claim 3, further comprising a matcher configured to construct training and/or labeling data for the learner component by heuristically matching attribute-value pairs from the plurality of digital risk-transfer policies containing the assessable characters, words, and string of words.

6. The system according to claim 5, wherein the matcher is configured to seek a unique pattern to match an attribute value, and to produce a best training set, the matcher is configured to perform at least:

(i) skipping an attribute value completely when multiple parts of a digital policy match the attribute value or an equivalent attribute, (ii) rejecting a pattern when the attribute value is not heads of the phrases containing them, and (iii) discarding a pattern when the attribute value does not appear in the same clause or in a parent/child clause in the parse tree.

7. The system according to claim 2, wherein the chained series of machine learning modeling structures include one or more recover structures configured to recover a structure of the selected digital one of the digital risk-transfer policies by grouping the words into coherent units of text at least including document artefacts or characteristics based on an output of the one or more parser structures.

8. The system according to claim 7, wherein the document artefacts comprise at least one of the group comprising: section headings, paragraphs, and tables.

9. The system according to claim 1, wherein the chained series of machine learning modeling structures include one or more identifier structures configured to identify elements of the selected one of the digital risk-transfer policies containing language elements defining condition parameters indicating offers providable to a policyholder of the selected one of the digital risk-transfer policies based on a signaling output of the one or more identifier structures.

10. The system according to claim 9, wherein the chained series of machine learning modeling structures includes one or more linker structures configured to translate and map the identified elements to one or more parameterized queries which are executed against a standardized database of customer data.

11. The system according to claim 1, wherein the digital risk-transfer policies include life risk-transfer structures at least including term life risk-transfer structures and/or health risk-transfer structures.

12. The system according to claim 11, wherein the digital risk-transfer policy is associated with a policyholder, and wherein, the policyholder, as a risk-exposed individual captured by a cover provided by one of the life risk-transfer structures, is associated with wearables and/or is associable with a measuring parameter, measuring parameter values of the wearables are assessed via the data interface and stored by the persistence repository unit, and the chained series of machine learning modeling structures is configured to automatically assess and process said measuring parameter values to automatically translate the processed data into the set of actions.

13. The system according to claim 12, wherein the policy holder is associated with at least one of the group comprising: bodily and environmental sensory devices, wearable telematics sensory devices, a measured laboratory parameter, and a clinical measuring parameter.

14. The system according to claim 1, wherein each of the digital risk-transfer policies includes at least one of the group comprising: deducible parameter values, risk-transfer type definition parameter values, policy limits parameter values, exclusion parameter values, and riders/addit parameter values.

15. A digital, parameter pattern-driven method for a data mining system with a knowledge extraction engine based on a customizable chained series of machine learning structures providing an automated pipeline for data processing of complex data structures with a hidden pattern detection for triggering automated underwriting processes, the method comprising:

assessing a plurality of digital risk-transfer policies via a data interface;

storing the digital risk-transfer policies in a persistence repository unit of the data mining system, each of the digital risk-transfer policies at least including premium parameter values;

automatically assessing and parsing a digital risk-transfer policy of the plurality of digital risk-transfer policies by the chained series of machine learning modeling structures, wherein each machine learning modeling structure of the chained series of machine learning modeling structures passes an output to a next machine learning modeling structure of the chained series of machine learning modeling structures; and automatically translating contractual language of the digital risk-transfer policy into a set of actions to be executed.

16. The method according to claim 15, wherein, for the assessing and the parsing, the chained series of machine learning modeling structures comprise one or more parser structures for selecting one of the digital risk-transfer policies of the persistence repository unit and parsing assessable characters, words, and string of words of the selected one of the digital risk-transfer policies into digital constituents by providing and storing a parse tree that at least includes location attributes of every character in the selected one of the digital risk-transfer policies.

17. The method according to claim 16, wherein the chained series of machine learning modeling structures include one or more recover structures recovering a structure of the selected one of the digital risk-transfer policies by grouping the words into coherent units of text at least including document artefacts or characteristics based on an output of the one or more parser structures.

18. The method according to claim 15, wherein the chained series of machine learning modeling structures include one or more identifier structures identifying elements of the selected one of the digital risk-transfer policies containing language elements defining condition parameters indicating offers providable to a policy holder of the selected one of the digital risk-transfer policies based on the output of the one or more identifier structures.

19. The method according to claim 18, wherein the chained series of machine learning modeling structures include one or more linker structures translating and mapping the identified elements to one or more parameterized queries which are executed against a standardized database of customer data.

20. The digital, parameter pattern-driven method according to claim 15, wherein each of the digital risk-transfer policies includes at least one of the group comprising: deducible parameter values, risk-transfer type definition parameter values, policy limits parameter values, exclusion parameter values, and riders/addit parameter values.

* * * * *